(12) United States Patent
Hirayama et al.

(10) Patent No.: US 11,070,695 B2
(45) Date of Patent: Jul. 20, 2021

(54) IMAGE READING DEVICE, STORAGE MEDIUM STORING ABNORMALITY DETECTION PROGRAM, AND ABNORMALITY DETECTION METHOD

(71) Applicant: SEIKO EPSON CORPORATION, Tokyo (JP)

(72) Inventors: Yuko Hirayama, Fukuoka (JP); Yuichi Kanai, Fukuoka (JP); Kazuya Takita, Yamaguchi (JP)

(73) Assignee: Seiko Epson Corporation, Tokyo (JP)

( * ) Notice: Subject to any disclaimer, the term of this patent is extended or adjusted under 35 U.S.C. 154(b) by 208 days.

(21) Appl. No.: 16/519,084

(22) Filed: Jul. 23, 2019

(65) Prior Publication Data

US 2020/0036850 A1    Jan. 30, 2020

(30) Foreign Application Priority Data

Jul. 25, 2018  (JP) .............................. JP2018-139566

(51) Int. Cl.
| | |
|---|---|
| *H04N 1/04* | (2006.01) |
| *H04N 1/00* | (2006.01) |
| *H04N 1/409* | (2006.01) |
| *G06T 7/00* | (2017.01) |
| *H04N 1/401* | (2006.01) |

(52) U.S. Cl.
CPC ....... *H04N 1/00824* (2013.01); *G06T 7/0008* (2013.01); *H04N 1/0009* (2013.01); *H04N 1/00018* (2013.01); *H04N 1/401* (2013.01); *H04N 1/4097* (2013.01)

(58) Field of Classification Search
CPC .......... H04N 1/00824; H04N 1/00018; H04N 1/0009; H04N 1/401; H04N 1/4097; G06T 7/0008
USPC ................. 358/461, 466, 496, 474; 382/274
See application file for complete search history.

(56) References Cited

U.S. PATENT DOCUMENTS

| | | | |
|---|---|---|---|
| 7,327,962 B2 * | 2/2008 | Shoji ..................... | G06K 15/408 399/9 |
| 9,516,194 B2 * | 12/2016 | Uchida ............. | H04N 1/00013 |
| 10,911,640 B2 * | 2/2021 | Otomaru .................. | H04N 1/60 |
| 2013/0070309 A1 | 3/2013 | Sakai et al. | |
| 2013/0278955 A1 | 10/2013 | Shimatani | |

(Continued)

FOREIGN PATENT DOCUMENTS

| | | |
|---|---|---|
| JP | 2013-070163 A | 4/2013 |
| JP | 2013-225822 A | 10/2013 |

*Primary Examiner* — Cheukfan Lee
(74) *Attorney, Agent, or Firm* — Global IP Counselors, LLP

(57) ABSTRACT

An image reading device includes a reading unit that reads a document sheet and a reading standard surface and outputs read values corresponding to pixels arranged in a main scan direction, a control unit that processes the read values, and a storage unit storing information to be referenced by the control unit. In the storage unit, first data that is read values of the reading standard surface and serves as standards, and second data on ranges of variation, based on a change in a temperature, in the read values are stored. The control unit determines, based on the first data and the second data read from the storage unit and third data obtained by reading the reading standard surface after an acquisition of the first data, whether an abnormality exists in the pixels.

10 Claims, 17 Drawing Sheets

(56) References Cited

U.S. PATENT DOCUMENTS

2016/0173722 A1* 6/2016 Uchida .................. H04N 1/401
　　　　　　　　　　　　　　　　　　　　　　358/1.9
2020/0106892 A1* 4/2020 Honda ............... H04N 1/00037

* cited by examiner

IMAGE READING DEVICE, STORAGE MEDIUM STORING ABNORMALITY DETECTION PROGRAM, AND ABNORMALITY DETECTION METHOD

The present application is based on, and claims priority from JP Application Serial Number 2018-139566, filed Jul., 25, 2018, the disclosure of which is hereby incorporated by reference herein in its entirety.

BACKGROUND

1. Technical Field

The present disclosure relates to an image reading device for reading an image of a document sheet, a storage medium storing an abnormality detection program, and an abnormality detection method.

2. Related Art

A scanner that is an example of an image reading device is described below. In the scanner, an image sensor typified by a contact image sensor (CIS) or a sensor with charge-coupled devices (CCDs) is used to read an image of a document sheet.

However, when an attached substance such as a fingerprint, paper dust, pencil powder, a correction fluid, paste, or condensation exists on a document reading surface, the substance appears as an abnormality in a reading result. For example, in a scanner that moves a document sheet with respect to an image sensor in an auxiliary scan direction without moving the image sensor, such an attached substance as described above appears in a reading result as a vertical stripe extending in the auxiliary scan direction or a direction in which a document sheet is transported.

Thus, a technique for detecting such an attached substance as described above is traditionally known and an example of the technique is disclosed in JP-A-2013-70163. Hereinafter, such an attached substance as described above is referred to as dirt in some cases.

An image reading device described in JP-A-2013-70163 determines whether each of pixels has been affected by dirt, based on the ratio of read data obtained by reading a standard plate in a state in which a pixel may be affected by dirt to initial data obtained by reading the standard plate in a state in which dirt does not adhere to the standard plate.

However, a light amount of a light source, a characteristic of a light receiving element, or the like may vary due to a change in a temperature and acquired data may vary due to the variation in the light amount, the variation in the characteristic, or the like. The variation in the acquired data may cause data that is not dirt to be erroneously determined to be dirt.

SUMMARY

According to an aspect of the disclosure, an image reading device includes a reading unit that reads a document sheet and a reading standard surface and outputs read values corresponding pixels arranged in a main scan direction, a control unit that processes the read values, and a storage unit storing information to be referenced by the control unit. In the storage unit, first data that is the read values of the reading standard surface and serves as standards, and second data on ranges of variation, based on a change in a temperature, in the read values are stored. The control unit determines whether an abnormality exists in the pixels based on the first and second data read from the storage unit and third data obtained by reading the reading standard surface after the acquisition of the first data.

DESCRIPTION OF EXEMPLARY EMBODIMENTS

Figure 1:
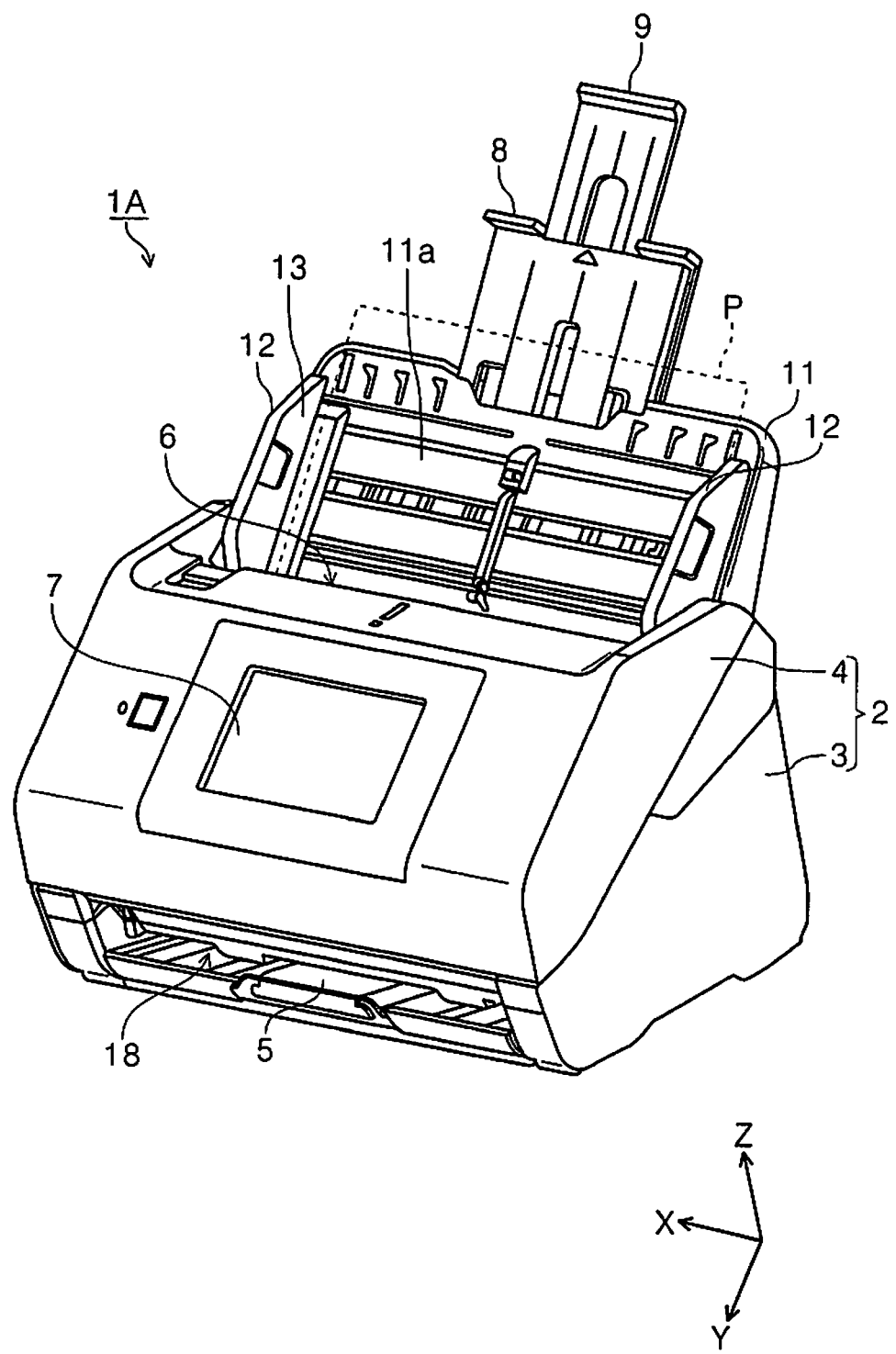
FIG. 1 is an external perspective view of a scanner according to an embodiment of the disclosure.

Hereinafter, aspects of the disclosure are described in brief.

According to a first aspect of the disclosure, an image reading device includes a reading unit that reads a document sheet and a reading standard surface and outputs read values corresponding to pixels arranged in a main scan direction, a control unit that processes the read values, and a storage unit storing information to be referenced by the control unit. In the storage unit, first data that is read values of the reading standard surface and serves as standards, and second data on ranges of variation, based on a change in a temperature, in the read values are stored. The control unit determines, based on the first data and the second data read from the storage unit and third data obtained by reading the reading standard surface after an acquisition of the first data, whether an abnormality exists in the pixels.

According to the first aspect, the control unit uses the second data on the ranges of variation, based on the change in the temperature, in the read values to determine whether an abnormality exists in each of the pixels. Thus, in the determination of whether an abnormality exists in each of the pixels, it is possible to suppress erroneous determination caused by a change in the temperature.

Hereinafter, an abnormality of a pixel means that a read value of the pixel is an abnormal value that is out of an acceptable range due to a substance attached to a reading surface.

According to a second aspect of the disclosure, in the first aspect, the second data is calculated values obtained by adding values equal to or larger than twice standard deviations of the ranges of variation, based on the change in the temperature, in the read values obtained for pixels using multiple image reading devices, each of which is the image reading device according to the first aspect, to average values of the ranges of variation, based on the change in the temperature, in the read values or is data obtained based on the calculated values.

According to the second aspect, since the second data is the calculated values obtained by adding the values equal to or larger than twice the standard deviations of the ranges of variation, based on the change in the temperature, in the read values obtained for the pixels using the multiple image reading devices to the average values of the ranges of variation, based on the change in the temperature, in the read values or is the data obtained based on the calculated values, it is possible to suppress the erroneous determination caused by the change in the temperature.

According to a third aspect of the disclosure, in the first or second aspect, when a difference between the first data and the third data after levels of the first data and the third data are matched to each other is larger than a threshold set based on the second data, the control unit determines that an abnormality exists in the pixel, and when the difference is equal to or smaller than the threshold, the control unit determines that an abnormality does not exist in the pixel.

According to a fourth aspect of the disclosure, in any of the first to third aspects, the reading unit includes a light source located at an edge in a first direction along the main scan direction and a light guide extending in the main scan direction and configured to guide, in a direction of the reading standard surface, light emitted in the main scan direction by the light source. The second data corresponds to pixels existing in a predetermined range from the edge in the first direction along the main scan direction to a pixel located in a second direction opposite to the first direction.

When the orientation of the light source with respect to the light guide changes due to a change in the temperature, a light amount for a pixel existing near the light guide in the main scan direction may significantly vary. According to the fourth aspect, since the second data indicating ranges of variation, based on the change in the temperature, in read values corresponds to the pixels existing in the predetermined range from the edge in the first direction along the main scan direction or from the side closer to the light guide to the pixel located in the second direction opposite to the first direction, it is possible to suppress the erroneous determination caused by the change in the temperature.

According to a fifth aspect of the disclosure, in any of the first to fourth aspects, the control unit detects, based on whether an abnormality exists in the pixels, an abnormal pixel range in which the number of pixels is larger than a first determination value that is defined in advance, and the control unit executes an abnormality process. The abnormal pixel range includes a range of continuous abnormal pixels where the abnormal pixels appear successively and a range of discontinuous abnormal pixels where one or more normal pixels interpose between an abnormal pixel and a next abnormal pixel, the number of the normal pixels being smaller than a second determination value that is defined in advance.

When a group of abnormal pixels is relatively large, the group of abnormal pixels is an image failure viewable by a user. However, even when not only continuous abnormal pixels but also discontinuous abnormal pixels between which a small number of normal pixels interpose may appear as image failures viewable by the user.

According to the fifth aspect, in the case where the abnormality process is executed when an abnormal pixel range is defined and the number of pixels included in the abnormal pixel range is larger than the first determination value that is defined in advance, the abnormal pixel range includes a range of continuous abnormal pixels where the abnormal pixels appear successively and a range of discontinuous abnormal pixels where one or more normal pixels interposed between an abnormal pixel and a next abnormal pixel, the number of the normal pixels is smaller than the second determination value that is defined in advance. Thus, an image failure viewable by the user can be more accurately detected.

According to a sixth aspect of the disclosure, in the fifth aspect, the control unit defines the abnormal pixel range based on whether an abnormality exists in all the pixels arranged in the main scan direction.

According to the sixth aspect, the control unit defines the abnormal pixel range based on whether an abnormality exists in all the pixels arranged in the main scan direction. Specifically, since all ranges of abnormal pixels within an entire region extending in the main scan direction are detected, an abnormal state can be appropriately recognized.

According to a seventh aspect of the disclosure, in the fifth aspect, after the control unit defines the abnormal pixel range for a first time, the control unit executes the abnormality process without searching for a next abnormal pixel range.

According to the seventh aspect, after the control unit defines the abnormal pixel range for the first time, the control unit executes the abnormality process without searching for a next abnormal pixel range. Thus, the process can be executed at a high speed.

According to an eighth aspect of the disclosure, in any of the fifth to seventh aspects, the first determination value includes a first setting value and a second setting value larger than the first setting value, and the control unit selects any of the first setting value and the second setting value.

According to the eighth aspect, since the first determination value includes the first setting value and the second setting value larger than the first setting value, and the control unit selects either the first setting value or the second setting value, the sensitivity of detecting an abnormality can be adjusted.

According to a ninth aspect of the disclosure, a non-transitory computer-readable storage medium stores an abnormality detection program for causing an image reading device, which includes a reading unit that reads a document sheet and a reading standard surface and outputs read values corresponding to pixels arranged in a main scan direction, a control unit that processes the read values, and a storage unit storing information to be referenced by the control unit, to detect, based on whether an abnormality exists in the pixels, an abnormal pixel range in which the number of pixels is larger than a first determination value that is defined in advance and to execute an abnormality process. The abnormality detection program includes reading first data indicating read values of the reading standard surface and serving as standards and second data on ranges of variation, based on a change in a temperature, in the read values, the first data and the second data being stored in the storage unit, and determining, based on third data obtained by reading the reading standard surface after the acquisition of the first data, whether an abnormality exists in the pixels; and setting, when one or more normal pixels interpose between an abnormal pixel and a next abnormal pixel, a range of the discontinuous abnormal pixels in which the number of the normal pixels is smaller than a second determination value that is defined in advance, to the abnormal pixel range.

According to the ninth aspect, effects that are the same as or similar to those obtained in the fifth aspect can be obtained.

According to a tenth aspect of the disclosure, an abnormality detection method for causing an image reading device, which includes a reading unit that reads a document sheet and a reading standard surface and outputs read values corresponding to pixels arranged in a main scan direction, a control unit that processes the read values, and a storage unit storing information to be referenced by the control unit, to detect, based on whether an abnormality exists in the pixels, an abnormal pixel range in which the number of pixels is larger than a first determination value that is defined in advance and to execute an abnormality process. The method includes: reading first data indicating read values of the reading standard surface and serving as standards and second data on ranges of variation, based on a change in a temperature, in the read values, the first data and the second data being stored in the storage unit, and determining, based on third data obtained by reading the reading standard surface after an acquisition of the first data, whether an abnormality exists in the pixels; and setting, when one or more normal pixels interpose between an abnormal pixel and a next abnormal pixel, a range of the discontinuous abnormal pixels in which the number of the normal pixels is smaller than a second determination value that is defined in advance, to the abnormal pixel range.

According to the tenth aspect, effects that are the same as or similar to those obtained in the fifth aspect can be obtained.

Hereinafter, the disclosure is described in detail.

An image reading device according to an embodiment of the disclosure, a non-transitory computer-readable storage medium storing an abnormal detection program according to the embodiment, and an abnormal detection method according to the embodiment are described with reference to the accompanying drawings. The embodiment describes, as an example of the image reading device, a document scanner (hereinafter merely referred to as scanner 1A) that can read at least one of front and back surfaces of a document sheet (hereinafter referred to as document sheet P) that is an example of a medium.

Figure 2:
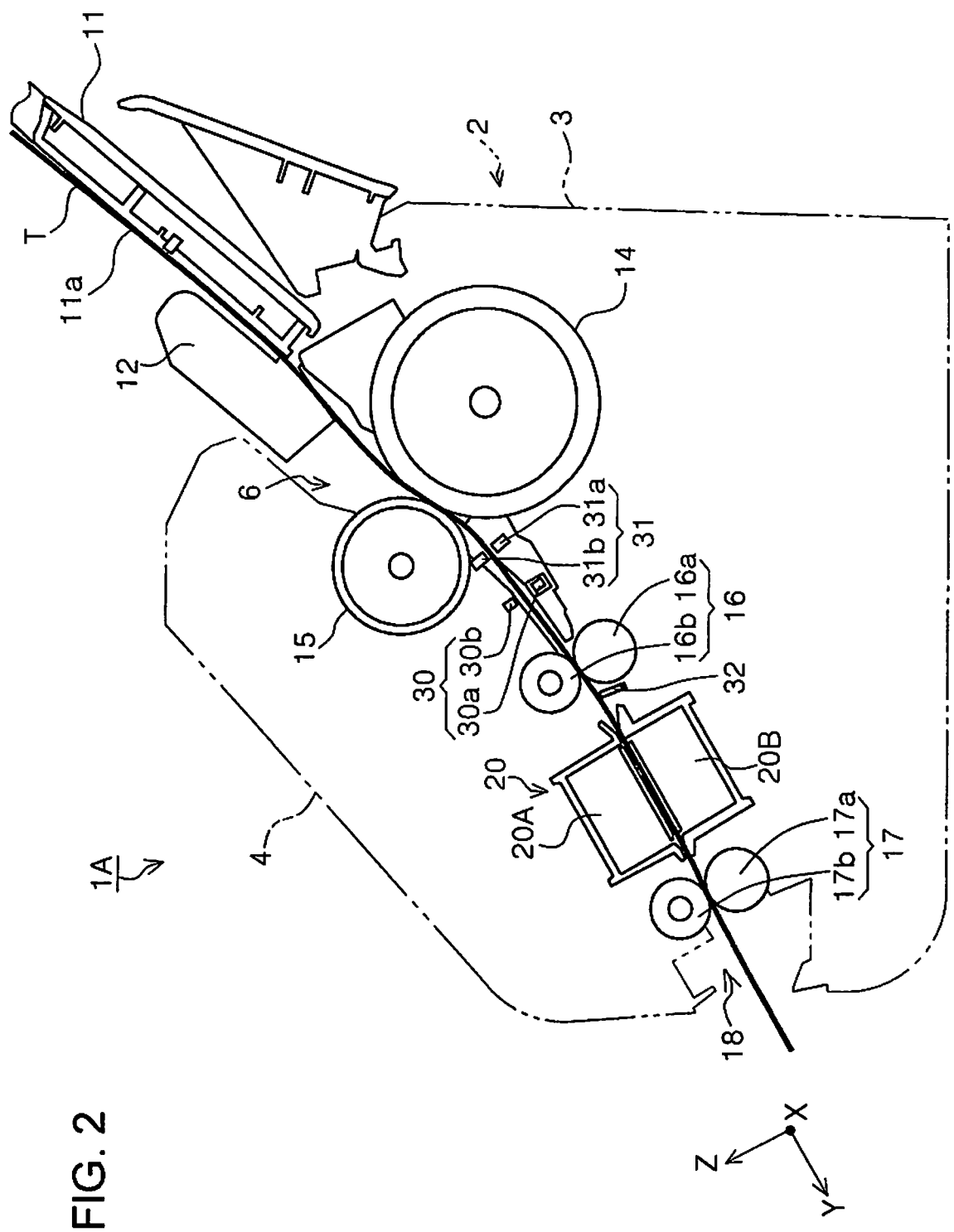
FIG. 2 is a side sectional view of a document sheet transport path of the scanner according to the embodiment of the disclosure.
Figure 4:
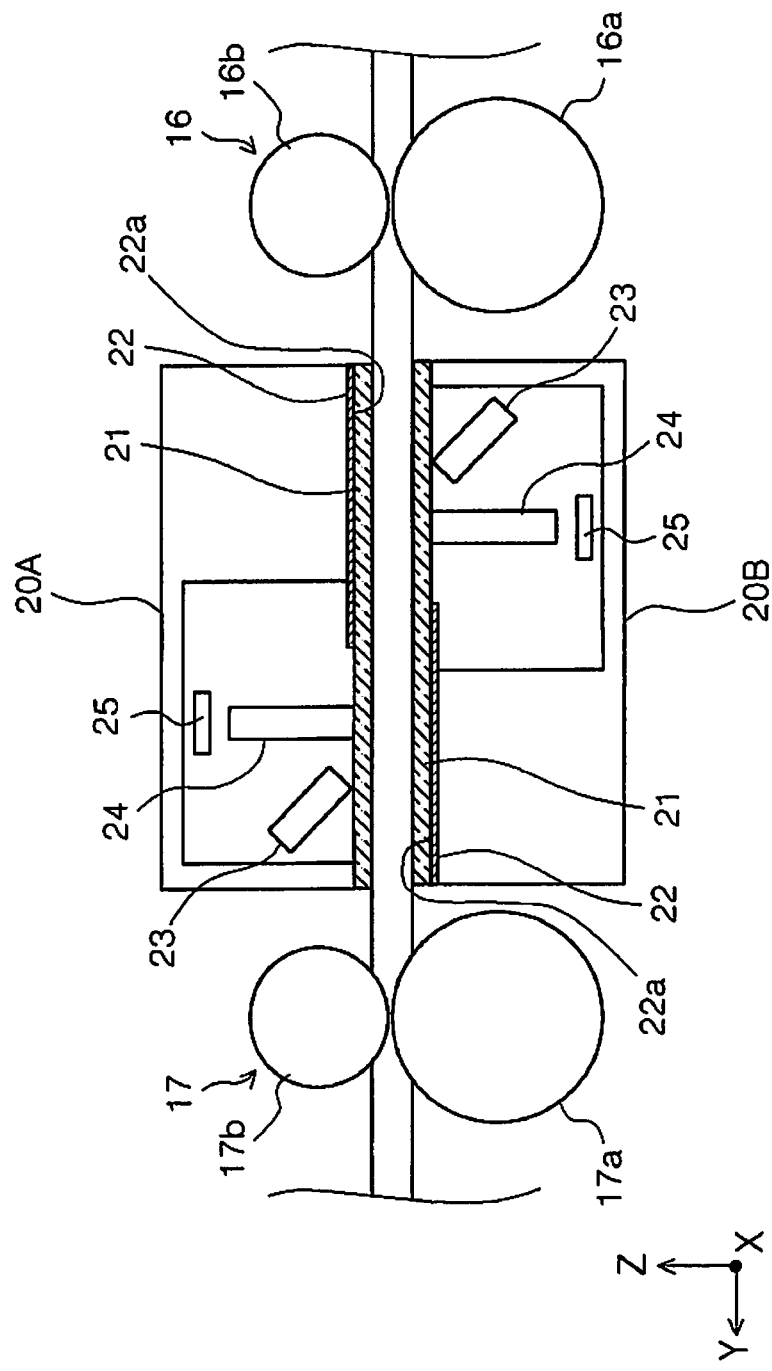
FIG. 4 is a diagram schematically showing a configuration of upper and lower reading sensors.

In an X-Y-Z coordinate system shown in FIGS. 1, 2 and 4, an X direction is a width direction of the device or a width direction of the document sheet, and a Y direction is a direction in which the document sheet is transported. A Z direction intersects with the Y direction and perpendicular to or substantially perpendicular to a surface of the transported document sheet. In addition, a positive side in the Y direction is referred to as device front surface side, and a negative side in the Y direction is referred to as device back surface side. Furthermore, a left side of the scanner when the scanner is viewed from the device front surface side is a positive side in the X direction, while a right side of the scanner when the scanner is viewed from the device front surface side is a negative side in the X direction. Furthermore, a positive side in the Z direction is referred to as device top side (on which a top portion and top surface of the scanner are located), and a negative side in the Z direction is referred to as device bottom side (on which a bottom portion and bottom surface of the scanner are located). Furthermore, a side (positive side in the Y direction) toward which the document sheet P is transported is referred to as "downstream" in some cases, and a side (negative side in the Y direction) opposite to the side toward which the document sheet P is transported is referred to as "upstream" in some cases.

Overview of Scanner

The scanner 1A includes a device body 2 that includes a reader 20 (shown in FIG. 2) for reading an image of the document sheet P.

The device body 2 includes a lower unit 3 and an upper unit 4. The upper unit 4 is openable and closable and can be pivoted with respect to the lower unit 3 while a pivoting point of the upper unit 4 is located downstream in the direction in which the document sheet is transported. When the upper unit 4 is rotated toward the device front surface side and opened and a document sheet transport path for the document sheet P is exposed, a jammed document sheet P can be easily extracted.

A document sheet mounting section 11 is installed on the side of a back surface of the device body 2. The document sheet mounting section 11 has a mounting surface 11a on which document sheets P to be transported are mounted. The document sheet mounting section 11 is attachable to and detachable from the device body 2.

A pair of left and right edge guides 12 is attached to the document sheet mounting section 11 and guides a document sheet P on edge sides in the width direction (X direction) intersecting with the transport direction (Y direction) of the document sheet P.

The document sheet mounting section 11 includes a first paper support 8 and a second paper support 9. The first paper support 8 and the second paper support 9 are retractable in and extendable from the document sheet mounting section 11 as shown in FIG. 1 to enable a length of the mounting surface 11a to be adjusted.

The device body 2 has an operation panel 7 on the device front surface side of the upper unit 4. An operation of setting various types of reading and an operation of executing reading are performed on the operation panel 7. The operation panel 7 enables a user interface (UI) that indicates details of settings for reading and the like. In the embodiment, the operation panel 7 is a so-called touch panel that displays information and receives information. In the embodiment, the operation panel 7 serves as an operation unit to be used to execute various operations and serves as a display unit for displaying various types of information.

A sheet feeding port 6 is installed at a top portion of the upper unit 4 and communicates with the inside of the device body 2. A document sheet P mounted on the document sheet mounting section 11 is transported from the sheet feeding port 6 toward the reader 20 installed in the device body 2.

A discharged sheet tray 5 for receiving a discharged document sheet P is installed on the device front surface side of the lower unit 3.

About Document Sheet Transport Path of Scanner

Next, the document sheet transport path of the scanner 1A is described mainly with reference to FIG. 2.

In FIG. 2, a solid line indicated by a reference symbol T indicates the document sheet transport path (or a trajectory along which a document sheet P is transported). The document sheet transport path T is a space between the lower unit 3 and the upper unit 4.

The document sheet mounting section 11 is installed most upstream on the document sheet transport path T. A feeding roller 14 and a separation roller 15 are installed downstream with respect to the document sheet mounting section 11. The feeding roller 14 transports a document sheet P mounted on the mounting surface 11a of the document sheet mounting section 11 toward the reader 20. The separation roller 15 causes the document sheet P to be nipped between the feeding roller 14 and the separation roller 15 and separates the document sheet P.

The feeding roller 14 contacts a document sheet P at the lowest position among document sheets P mounted on the mounting surface 11a of the document sheet mounting section 11. Thus, in the case where multiple document sheets P are set on the document sheet mounting section 11 of the scanner 1A, the document sheets P are transported downstream in order from a document sheet P set on the side of the mounting surface 11a.

The document sheet mounting section 11 has a sensor (not shown) for detecting whether a document sheet P exists on the document sheet mounting section 11.

Figure 3:
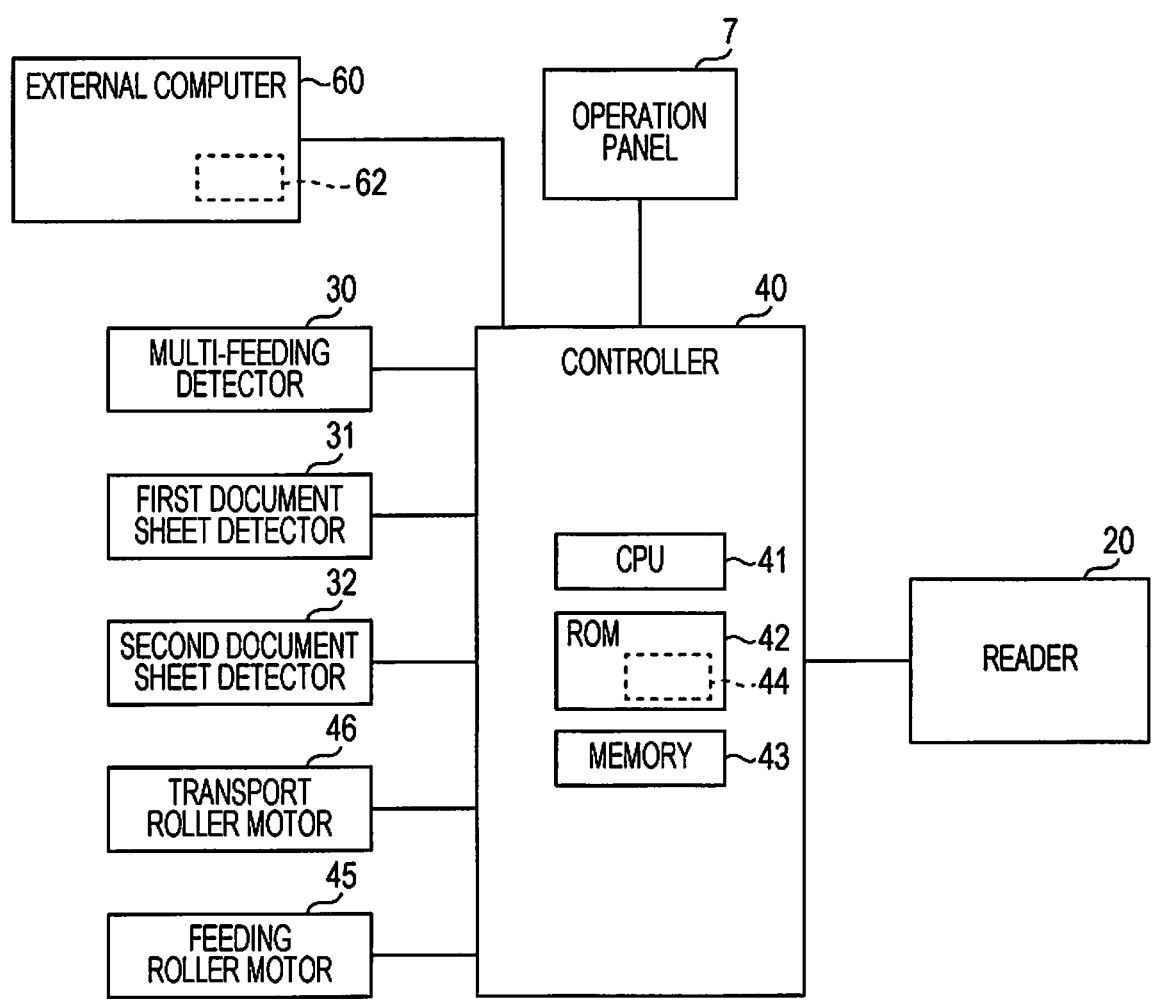
FIG. 3 is a block diagram showing a control system of the scanner according to the embodiment of the disclosure.

The feeding roller 14 is rotationally driven by a feeding roller motor 45 (shown in FIG. 3). The feeding roller 14 receives rotational torque from the feeding roller motor 45, thereby rotating in a counterclockwise direction in FIG. 2.

Rotational torque is transmitted from a transport roller motor 46 (shown in FIG. 3) via a torque limiter (not shown) to the separation roller 15.

When a document sheet P does not exist between the feeding roller 14 and the separation roller 15, or when only one document sheet P exists between the feeding roller 14 and the separation roller 15, the torque limiter (not shown) slips and the separation roller 15 is rotated (in a clockwise direction in FIG. 2) by the rotation of the feeding roller 14 regardless of the rotational torque received from the transport roller motor 46.

When not only a document sheet P to be transported but also one or more document sheets P are transported into a region between the transport roller 14 and the separation roller 15, the document sheets P slide on each other and the separation roller 15 is rotated in the counterclockwise direction in FIG. 2 by rotational torque received from the transport roller motor 46. This operation prevents the document sheets P from being transported in an overlapping state.

A transport roller pair 16, the reader 20 for reading an image, and a discharge roller pair 17 are installed downstream with respect to the transport roller 14. The transport roller pair 16 is composed of a transport driving roller 16a to be rotationally driven by the transport roller motor 46 (shown in FIG. 3) and a transport driven roller 16b to be rotated by the rotation of the transport driving roller 16a.

A document sheet P nipped by the transport roller 14 and the separation roller 15 and transported downstream by the transport roller 14 and the separation roller 15 is nipped by the transport roller pair 16 and transported by the transport roller pair 16 to the reader 20 located downstream with respect to the transport roller pair 16.

A first document sheet detector 31 is installed downstream with respect to the transport roller 14. The first document sheet detector 31 is configured as an optical sensor as an example and composed of a light emitter 31a and a light receiver 31b that are arranged opposite to each other with respect to the document sheet transport path T. The light receiver 31b transmits an electric signal indicating the intensity of detected light to a controller 40 (shown in FIG. 3). When a transported document sheet P blocks light emitted by the light emitter 31a, the electric signal indicating the intensity of detected light is changed. Thus, the controller 40 can detect the passing of a front or rear edge of the document sheet P based on the change in the electric signal.

A multi-feeding detector 30 that detects multi-feeding of document sheets P is installed downstream with respect to the first document sheet detector 31. The multi-feeding detector 30 includes an ultrasonic wave transmitter 30a and an ultrasonic wave receiver 30b that are arranged opposite to each other with respect to the document sheet transport path T. The ultrasonic wave receiver 30b receives an ultrasonic wave. The ultrasonic wave receiver 30b transmits an electric signal indicating the intensity of the received ultrasonic wave to the controller 40 (shown in FIG. 3). When the multi-feeding of document sheets P occurs, the electric signal indicating the intensity of the ultrasonic wave changes. Thus, the controller 40 can detect the multi-feeding of the document sheets P based on the change in the electric signal.

A second document sheet detector 32 is installed downstream with respect to the multi-feeding detector 30. The second document sheet detector 32 is configured as a contact sensor having a lever. When the lever pivots due to the passing of a front or rear edge of a document sheet P, an electric signal to be transmitted by the second document detector 32 to the controller 40 (shown in FIG. 3) changes. Thus, the controller 40 can detect the passing of the front or rear edge of the document sheet P based on the change in the electric signal.

The controller 40 can recognize the position of a document sheet P on the document sheet transport path T based on the electric signals transmitted by the first and second document sheet detectors 31 and 32.

The reader 20 installed downstream with respect to the second document sheet detector 32 includes an upper reading sensor 20A installed on the side of the upper unit 4 and a lower reading sensor 20B installed on the side of the lower unit 3. In the embodiment, the upper reading sensor 20A and the lower reading sensor 20B are configured as contact image sensor modules (CISMs) as an example.

A configuration of the reader 20 is described later.

After an image of at least one of front and back surfaces of a document sheet P is read by the reader 20, the document sheet P is nipped by the discharge roller pair 17 located downstream with respect to the reader 20 and is discharged from a discharge port 18 installed on the device front surface side of the lower unit 3.

The discharge roller pair 17 is composed of a discharge driving roller 17a and a discharge driven roller 17b. The discharge driving roller 17a is rotationally driven by the transport roller motor 46 (shown in FIG. 3). The discharge driven roller 17b is rotated by the rotation of the discharge driving roller 17a.

About Control System of Scanner

A control system of the scanner 1A is described below with reference to FIG. 3. FIG. 3 is a block diagram showing the control system of the scanner 1A according to the embodiment of the disclosure.

In FIG. 3, the controller 40 that serves as a control unit executes, on the scanner 1A, various types of control including control of feeding and reading of a document sheet P. The controller 40 receives a signal from the operation panel 7 and transmits, to the operation panel 7, a signal to enable displaying of the operation panel 7 and especially enable the user interface (UI).

The controller 40 controls the feeding roller motor 45 and the transport roller motor 46. As described above, the feeding roller motor 45 is a driving source for the feeding roller 14. The transport roller motor 46 is a driving source for the separation roller 15, the transport roller pair 16, and the discharge roller pair 17.

The controller 40 receives read data from the reader 20 and transmits a signal to control the reader 20 to the reader 20.

The controller 40 receives detected signals from the multi-feeding detector 30, the first document sheet detector 31, and the second document sheet detector 32 and executes necessary control based on the detected signals.

The controller 40 includes a CPU 41, a ROM 42, and a memory 43. The CPU 41 executes various types of arithmetic processing in accordance with a program 44 stored in the ROM 42 to control operations of the entire scanner 1A. The memory 43 is an example of a storage unit. The memory 43 is a readable and writable nonvolatile memory. Data and the like that are necessary for abnormality detection described later are all stored in the memory 43. The controller 40 writes predetermined data to the memory 43 if necessary.

The program 44 stored in the ROM 42 may not be a single program and may be composed of multiple programs including an abnormality detection program (described later) according to the embodiment of the disclosure, a program for controlling the UI displayed on the operation panel 7, and various control programs necessary for the transporting and reading of a document sheet.

The scanner 1A is connectable to an external computer 60. The controller 40 receives information from the external computer 60. The external computer 60 includes a display unit 62. A user interface (UI) is enabled in the display unit 62 by a control program stored in a storage unit (not shown) included in the external computer 60.

About Reader

The reader 20 is described with reference to FIG. 4. The reader 20 includes the upper reading sensor 20A and the lower reading sensor 20B. Since basic configurations of the upper and lower reading sensors 20A and 20B are the same, the configuration of the lower reading sensor 20B is described below.

The lower reading sensor 20B includes a transmissive plate 21, a standard plate 22, a light guide 23, a lens 24, and a line sensor 25.

The lower reading sensor 20B is long in a main scan direction (X direction). The transmissive plate 21, the standard plate 22, the light guide 23, the lens 24, and the line sensor 25 are also long in the main scan direction.

The transmissive plate 21 may be made of colorless and transparent glass or may be a resin plate such as a colorless and transparent acrylic plate. The transmissive plate 21 has a surface facing an outer surface or the upper reading sensor 20A and forming a portion of the document sheet transport path T. The outer surface is a reading surface on which a document sheet P is read.

The standard plate 22 is read by a line sensor 25 of the upper reading sensor 20A for shading correction. The standard plate 22 has a reading standard surface 22a facing the upper reading sensor 20A. As the standard plate 22, a resin plate of a white color, a gray color, a black color, or the like, a metal plate painted in white, gray, black, or the like, or the like may be used, for example.

The light guide 23 is a light guiding member for guiding light toward a document sheet P or the standard plate 22. The light guide 23 guides light emitted by an LED module 26 (shown in FIG. 7) in the main scan direction toward the upper reading sensor 20A. The LED module 26 is an example of a light source.

The emitted light is reflected on the document sheet P or a reading standard surface 22a of the upper reading sensor 20A, reaches the line sensor 25 via the lens 24, and is measured by the line sensor 25.

The line sensor 25 includes photodiodes arranged in the main scan direction. The photodiodes are an example of photoelectric conversion elements. A single photoelectric conversion element corresponds to a single pixel. The line sensor 25 outputs read data of light measured by the photoelectric conversion elements.

In the embodiment, the light source is constituted by the LED module 26, but is not limited to this. Another light source such as a fluorescent lamp may be used.

In the embodiment, the line sensor 25 is a complementary metal-oxide semiconductor (CMOS) image sensor, but is not limited to this. Another solid imaging element such as a line sensor constituted by a charge coupled device (CCD) or an area sensor may be used as the line sensor 25.

About Correction of Read Values Using Ranges of Variation Based on Change in Temperature Next, the correction of read values using ranges of variation based on a change in a temperature is described with reference to FIGS. 5 to 9.

Figure 5:
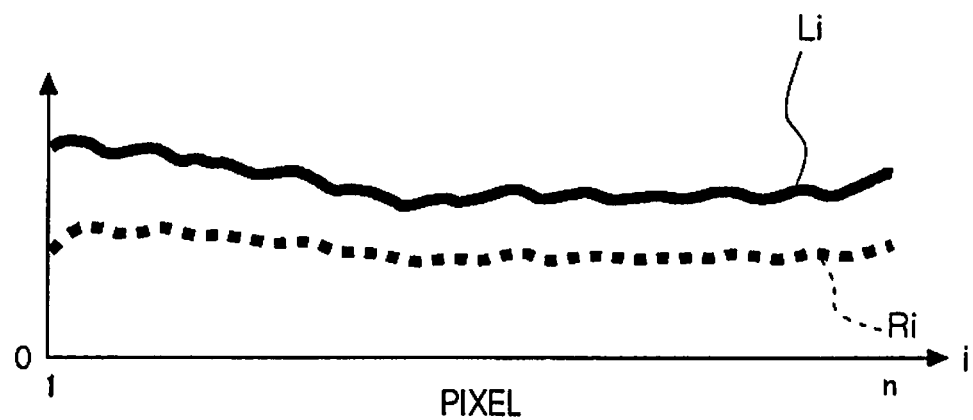
FIG. 5 is a graph showing an example of first data acquired before the shipment of the product and third data indicating normal values and acquired in an environment in which a user uses the product after the shipment of the product.
Figure 6:
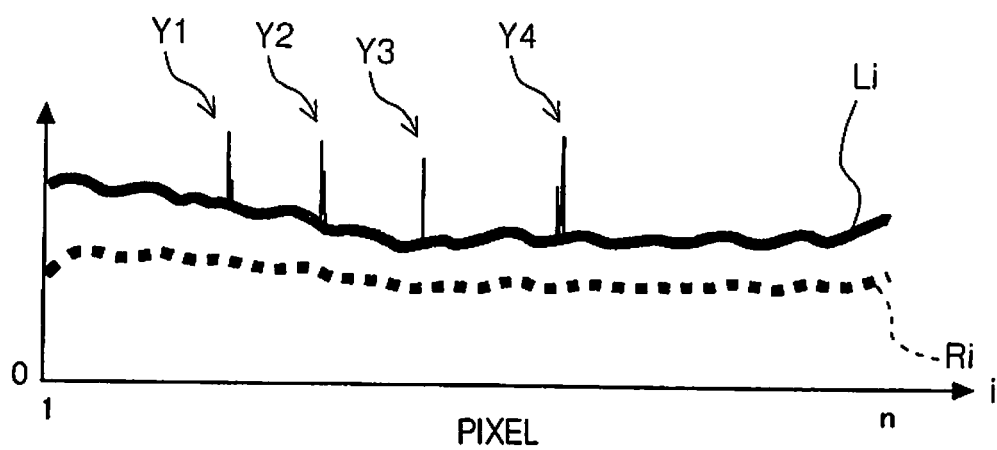
FIG. 6 is a graph showing an example of the first data acquired before the shipment of the product and third data indicating abnormal values and acquired in an environment in which the user uses the product after the shipment of the product.

In each of FIGS. 5 and 6, an abscissa indicates a pixel, a left end indicates a first pixel, a right end indicates an n-th pixel. For example, when a shorter side of a document sheet of the A4 size is read at a resolution of 600 dpi, n=5100. The first pixel and the n-th pixel may not be pixels of both ends of the line sensor 25. A number n of pixels may be a value obtained by adding a small margin to the size of the document sheet.

In each of FIGS. 5 and 6, an ordinate indicates a read value of a pixel or indicates the intensity of received light.

In each of FIGS. 5 and 6, data $R_i$ (i=1 to n) indicated by a broken line is an example of "first data" and is standard data obtained by reading the standard plate 22 in a state in which dirt is not attached to the transmissive plate 21 in a process of manufacturing the scanner 1A or before the shipment of the product.

Data $L_i$ (i=1 to n) is an example of "third data". The data $L_i$ is obtained by reading the standard plate 22 in a state in which dirt is likely to be attached to the transmissive plate 21 in an environment in which the user uses the product or after the shipment of the product. The data $L_i$ is used for so-called shading correction.

In a state in which dirt is not attached to the transmissive plate 21, the data $L_i$ is shown in FIG. 5. When dirt is attached to the transmissive plate 21, the data $L_i$ includes abnormal points indicated by Y1, Y2, Y3, and Y4 in FIG. 6.

As a basic idea, when a difference between a value included in the data $R_i$ and corresponding to a pixel $X_i$ (i=1 to n) and a value included in the data Li and corresponding to the pixel Xi is smaller than a set threshold Shi (i=1 to n), the pixel Xi is not subjected to the counting of either or both of dirt detection widths Xw1 and Xw2 described later. When the difference is larger than the threshold Shi, the pixel Xi is subjected to the counting of either or both of the dirt detection widths Xw1 and Xw2. In the embodiment, when either or both of the dirt detection widths Xw1 and Xw2 is or are larger than a predetermined width, it is determined that dirt is being attached to the transmissive plate 21. This determination is described later in detail. In this specification, a pixel to be subjected to the counting of either or both of the dirt detection widths Xw1 and Xw2 described later is treated as an "abnormal pixel" or a "dirty pixel", and a pixel that is not to be subjected to the counting of the dirt detection widths Xw1 and Xw2 is treated as a "normal pixel" or a "non-dirty pixel".

In the embodiment, the difference is an absolute value and is a positive value, and the threshold Shi is also a positive value. Positive and negative values of the difference and the threshold Shi, however, may be distinguished.

The data Ri is stored in, for example, the memory 43 (shown in FIG. 3). The threshold Shi may be preset and stored in the memory 43 or may be calculated and set for each time when the calculation is executed. When the threshold Shi is to be calculated, an equation and a parameter to be used for the calculation are stored in the memory 43. In the embodiment, the threshold Shi is calculated and set for each time when the calculation is executed. The parameter to be used for the calculation is an example of "second data".

The data Li that serves as the third data may be written to and held in the memory 43 for each time when the calculation is executed.

As shown in FIGS. 5 and 6, when a level of the data Ri is different from a level of the data Li due to a difference between levels of light radiated by the LED module 26 (shown in FIG. 7) upon the acquisition of the data, the matching of the levels of the data Ri and Li or ratio adjustment may be executed and the difference between the levels of the data Ri and Li may be calculated.

The level matching is executed by calculating the ratio of the data Li to the data Ri for each of pixels Xi, calculating an average value of the ratios calculated for all the pixels Xi, and multiplying the average value by all pixel values of the data Ri or all pixel values of the data Li.

The embodiment assumes that the level of the data Ri is matched to the level of the data Li. The data Ri subjected to the level matching to the data Li is referred to as data RRi. Differences between the data RRi and the data Li are differences Di (i=1 to n). The data RRi and the differences Di are used for the following description.

In the embodiment, thresholds Shi are calculated based on the "second data". Whether an abnormality exists in each of the pixels Xi is determined by comparing the differences Di with the thresholds Shi. The "second data" is related to ranges of variation, based on a change in a temperature, in read values. Specifically, in the embodiment, variations, based on the change in the temperature, in the read values are used in the setting of the thresholds Shi.

Figure 7:
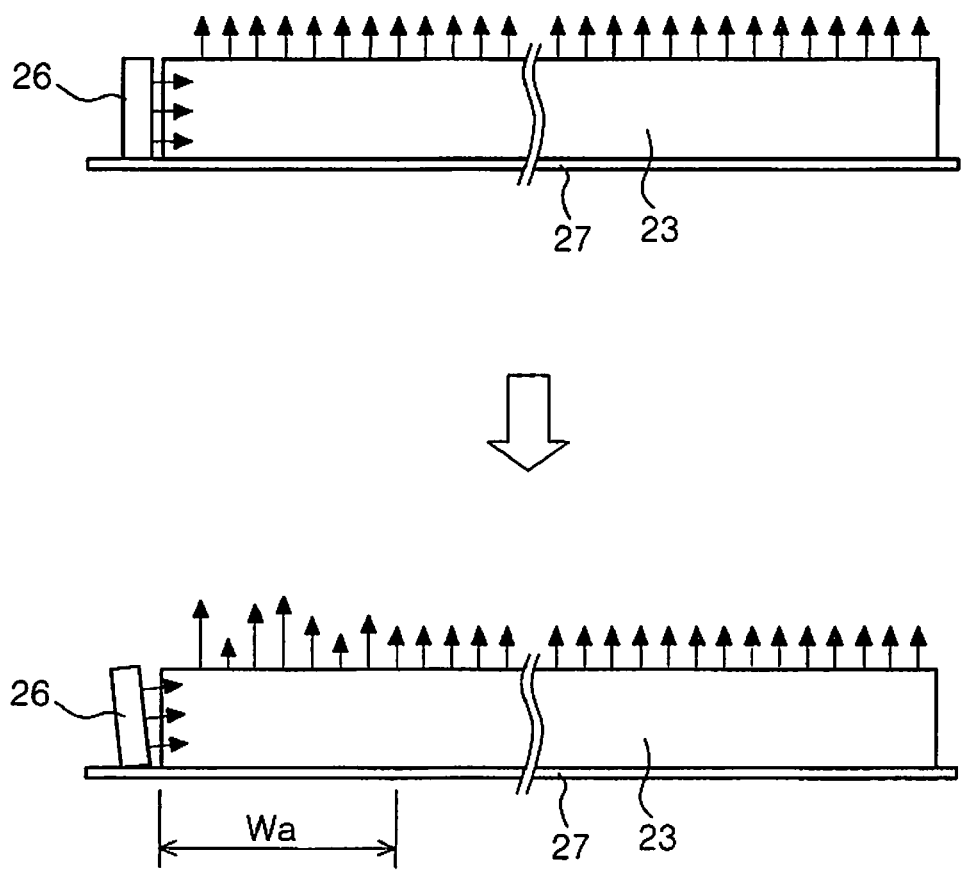
FIG. 7 is a diagram schematically showing positional relationships between an LED module that is an example of a light source and a light guide.

The variations, caused by the change in the temperature, in the read values occur due to the change in the orientation of the LED module 26 with respect to the light guide 23 as shown in FIG. 7 as an example. In FIG. 7, the LED module 26 and the light guide 23 are mounted on a substrate 27. The orientation of the LED module 26 with respect to the light guide 23 may change due to the difference between a thermal expansion coefficient of the light guide 23 and a thermal expansion coefficient of the substrate 27. For example, in a high-temperature environment (at a temperature of, for example, 35° C.), light is emitted by the LED module 26 in the main scan direction as shown on the upper side of FIG. 7. In a low-temperature environment (at a temperature of, for example, 10° C.), however, the orientation of the LED module 26 with respect to the light guide 23 changes as shown on the lower side of FIG. 7, and as a result, read values in a predetermined range Wa from the side of the LED module 26 include temperature-variable factors.

Figure 8:
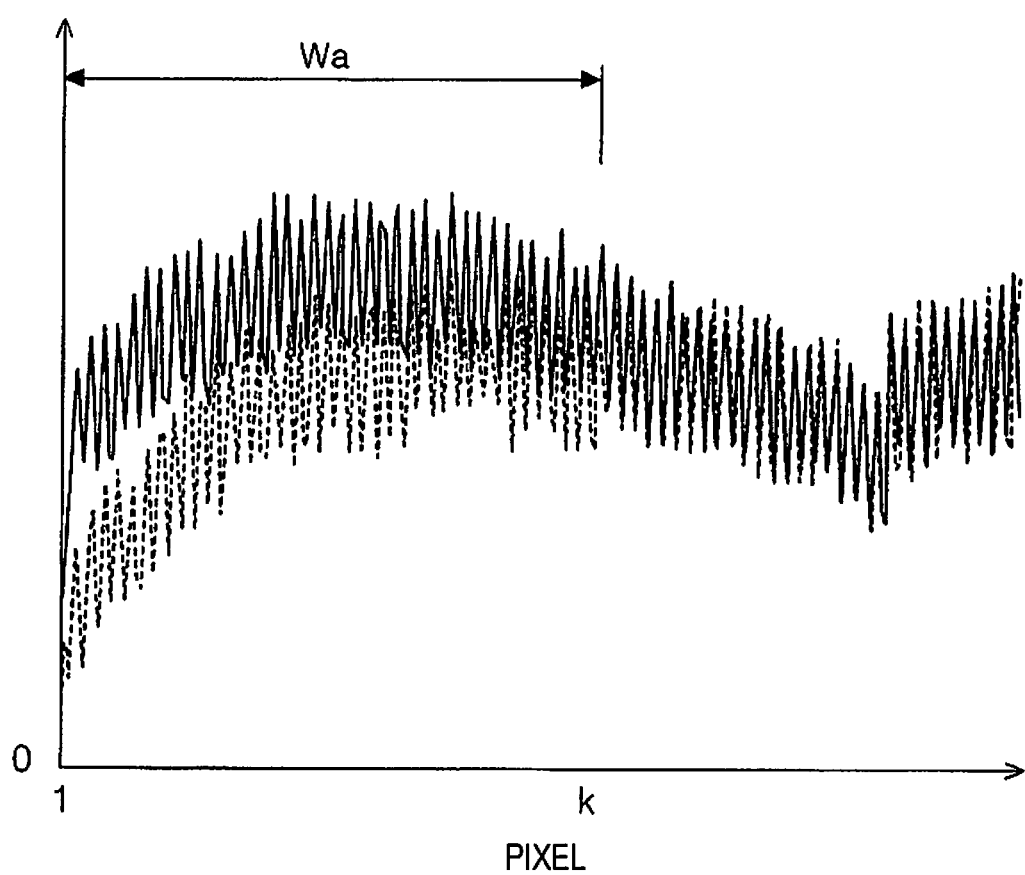
FIG. 8 is a graph showing an example of values read at a temperature of 10° C. and values read at a temperature of 35° C.

In FIG. 8, an abscissa indicates a pixel, an ordinate indicates the intensity of received light, a solid line indicates read values acquired in a high-temperature environment, and a broken line indicates read values acquired in a low-temperature environment. As shown in FIG. 8, read values of pixels in a predetermined range Wa from the side of the LED module 26 vary depending on the temperature.

In the embodiment, when the aforementioned predetermined range Wa is from the first pixel to a k-th pixel, a threshold Shi is set for the pixels that are in the range Wa and another threshold Shi is set for pixels that are out of the range Wa. Specifically, the thresholds Shi are calculated according to the following equations. When Pixel Xi (i=1 to k) is in Range Wa The threshold Shi=data RRi×a third correction value Ei+a second correction value Gi+a first correction value Fi . . . (1)

When Pixel Xi (i >k) is out of Range Wa

The threshold Shi=the data RRi x the third correction value Ei+the second correction value Gi . . . (2)

The first correction value Fi (i=1 to k) is a range of variation, caused by a change in the orientation of the LED module 26 with respect to the light guide 23, in a read value as described above and is an example of the "second data".

The second correction value Gi (i=1 to n) is a range of variation, caused by a deviation of the amount of light emitted by the light source from a target light amount, in a read value.

The third correction value Ei (i=1 to n) is a range of variation, caused by a lens cycle irregularity, in a read value and is expressed in percentage. The lens cycle irregularity is caused by a movement of the lens 24 (shown in FIG. 4) in the X direction. The lens cycle irregularity is not limited to an irregularity within the predetermined range Wa and may occur in a range of all the pixels Xi.

Figure 9:
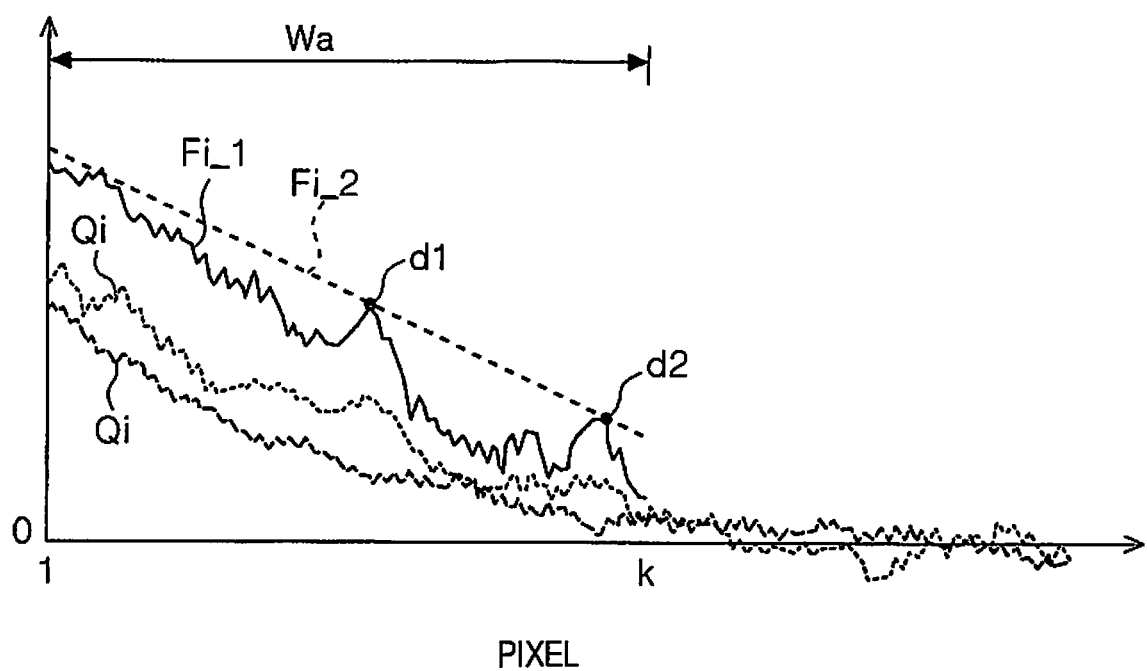
FIG. 9 is a graph showing an example of ranges of variation in read values, acquired from multiple devices, of pixels and values obtained by adding $4\sigma$ to average values of the ranges.

The first correction value Fi and a parameter k indicating a pixel range to which the first correction value Fi is applied can be calculated according to the following method, for example. First, multiple scanners 1A are used to calculate a range Qi (i=1 to n) of variation, based on a change in the temperature, in a read value of each of pixels Xi. FIG. 9 shows an example of ranges Qi of variation, based on a change in the temperature, in read values acquired using two scanners 1A.

In FIG. 9, an abscissa indicates a pixel and an ordinate indicates a range of variation. As shown in FIG. 9, ranges Qi of variation, based on the change in the temperature, in read values of pixels X1 to Xk in a predetermined range Wa from the side of LED modules 26 are relatively large, while ranges of variation, based on the change in the temperature, in read values of pixels Xk+1 to Xn in a range on the right side of the range Wa are close to zero.

Next, average values Ai (i=1 to k) of the ranges Qi of variation based on the change in the temperature and standard deviations σi (i=1 to k) are calculated and first correction values Fi are calculated according to an equation of Fi=Ai+4σi. Fi_1 shown in FIG. 9 indicates an example of the first correction values Fi obtained in this manner. In this case, the first correction values Fi can be stored in the memory 43 (shown in FIG. 2).

Each of the average values Ai does not indicate an average value of pixels of a certain scanner 1A and indicates an average value between the scanners 1A for each of the pixels Xi.

The values added to the average values Ai are not limited to four times the standard deviations and may be two or three times the standard deviations.

The ranges Qi, used to calculate the first correction values Fi, of variation based on the change in the temperature may be data of all the multiple scanners A1 when the multiple scanners 1A are used to obtain the data. Alternatively, the ranges Qi, used to calculate the first correction values Fi, of variation based on the change in the temperature may be data of arbitrarily selected large ranges of variation, caused by the change in the temperature, in read values of pixels of all the multiple scanners 1A.

In addition, a first correction value Fi may not be defined for each of the pixels Xi as described above and may be calculated for each time when the calculation is executed. In the embodiment, this method is used. For example, the first correction values Fi may be calculated according to a linear function expression indicating a straight line connecting arbitrary two values obtained from the aforementioned formula of (Ai+4σi) to each other. The arbitrary two values may be unexpected values, for example. A straight line Fi_2 indicated by a broken line in FIG. 9 indicates an example of the straight line connecting the arbitrary two values to each other and connects, to each other, two points d1 and d2 indicating unexpected values included in the data Fi_1. In this case, the first correction values Fi can be expressed by a linear functional expression Fi=−ax+b. This linear functional expression is stored as the second data in the memory 43 (shown in FIG. 2).

As described above, in the embodiment, the thresholds Shi are set based on the second correction values Gi, the third correction values Ei, and the first correction values Fi, which are an example of the "second data". The first correction values Fi and the linear functional expression Fi=−ax+b to be used to calculate the first correction values Fi are examples of the second data.

When the sensitivity of detecting an abnormality is to be reduced, the thresholds Shi may be set to values obtained by adding a predetermined margin value to the sums of the aforementioned correction values.

Figure 10:
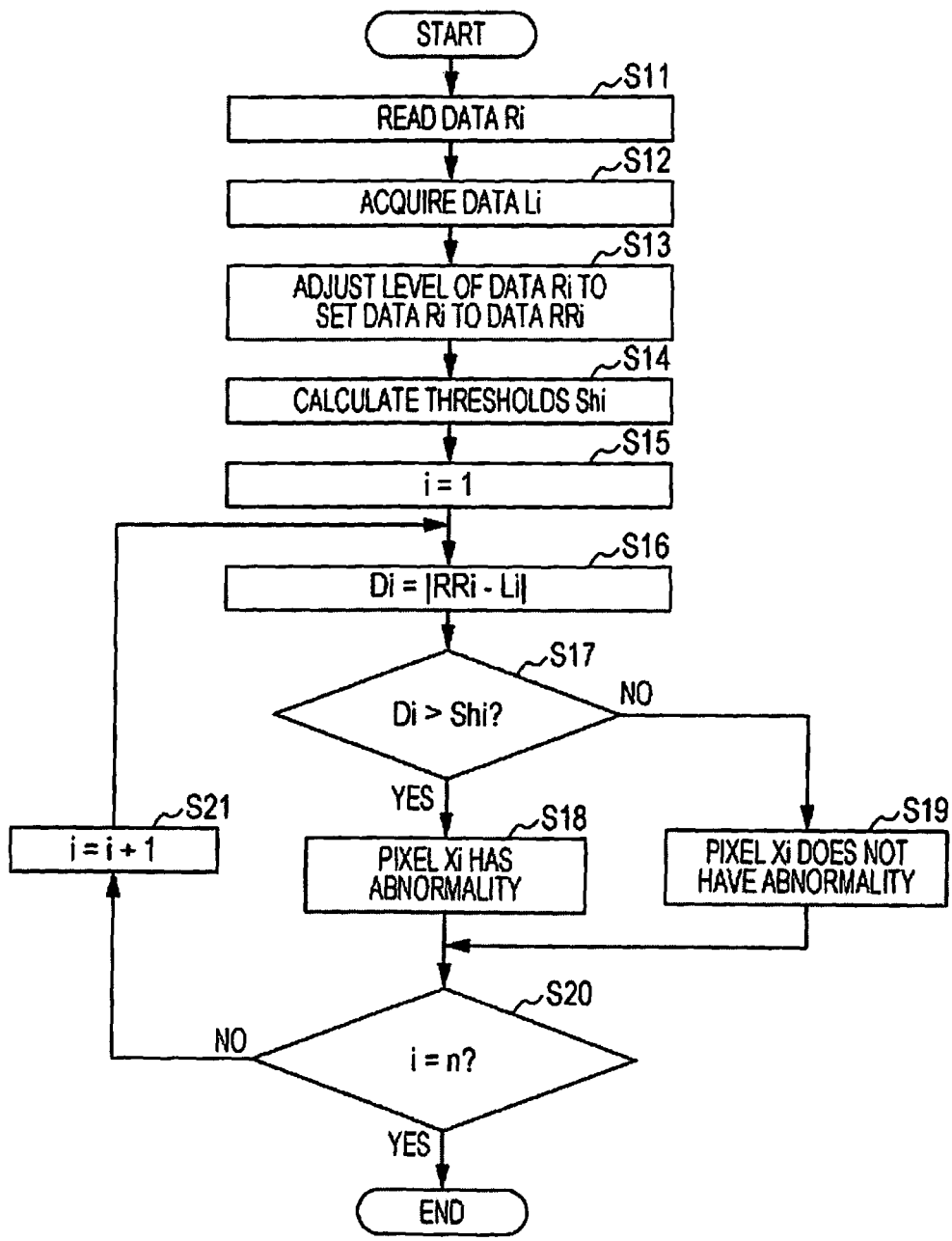
FIG. 10 is a flowchart showing a flow for determining whether an abnormality exists in each of the pixels.

FIG. 10 shows a flow for determining whether an abnormality exists in each of the pixels Xi. The controller 40 reads the data Ri (in step S11), acquires the data Li (in step S12), and adjusts the levels of the data Ri and Li (in step S13). In the embodiment, as described above, the level of the data Ri is matched to the level of the data Li to obtain the data RRi.

Then, the thresholds Shi are calculated according to the aforementioned method (in step S14).

Next, a difference Di between data RRi and data Li is calculated for a pixel Xi (in step S16) and compared with a threshold Shi (in step S17). When the difference Di is equal to or smaller than the threshold Shi (No in step S17), it is determined that the pixel Xi does not have an abnormality (in step S19). When the difference Di is larger than the threshold Shi (Yes in step S17), it is determined that the pixel Xi has an abnormality (in step S18).

The aforementioned determination process is executed on each of the first to n-th pixels (in steps S15, S20, and S21).

In the aforementioned example, the thresholds Shi are set based on the temperature-variable factors. The thresholds Shi, however, may be set without using the temperature-variable factors. The temperature-variable factors may be added to the differences Di between the data RRi and the data Li to obtain differences DDi, and the obtained differences DDi may be compared with the thresholds Shi.

As described above, the scanner 1A according to the embodiment includes the reader 20, the controller 40, and the memory 43. The reader 20 is an example of a reading unit that reads a document sheet and the reading standard surface and outputs read values corresponding to pixels arranged in the main scan direction. The controller 40 is an example of a control unit that processes the read values. The memory 43 is an example of a storage unit storing information to be referenced by the controller 40. In the memory 43, the data Ri and the first correction values Fi, specifically, the linear functional expression Fi=−ax+b are stored. The data Ri is an example of the first data that is the read values of the reading standard surface and serves as standards. The first correction values Fi are an example of the second data on ranges of variation, based on a change in the temperature, in the read values. The linear functional expression Fi=−ax+b is used to calculate the first correction values Fi. The controller 40 determines whether an abnormality exists in each of the pixels based on the data Li obtained by reading the reading standard surface after the acquisition of the data Ri, the data Ri read from the memory 43, and the second data. The data Li is an example of the third data. Thus, in the determination of whether an abnormality exists in each of the pixels Xi, it is possible to suppress erroneous determination caused by a change in the temperature.

In the embodiment, since the linear functional expression Fi=−ax+b to be used to calculate the first correction values Fi that are the calculated values is obtained based on data obtained by adding values equal to or larger than twice the standard deviations ai of the ranges Qi of variation based on the change in the temperature, in the read values obtained from the pixels of the multiple scanners 1A to the average values Ai of the ranges Qi of variation, based on the change in the temperature, in the read values, it is possible to reliably suppress the erroneous determination caused by the change in the temperature.

In the embodiment, when a difference Di between data Li and data RRi obtained by matching the level of the data Ri to the level of the data Li is larger than a threshold Shi based on the second data, the controller 40 determines that an abnormality exists in a corresponding pixel Xi. When the difference Di is equal to or smaller than the threshold Shi, the controller 40 determines that an abnormality does not exist in the pixel Xi.

In the embodiment, the reader 20 includes the LED modules 26 and the light guides 23. Each of the LED modules 26 is an example of a light source located at an edge in a first direction along the main scan direction or on the left side of FIG. 7. The light guides 23 extend in the main scan direction and guide light emitted by the LED modules 26 along the main scan direction in the reading standard surface direction or toward an upward direction in FIG. 7. The second data corresponds to pixels included in the predetermined range Wa from the edge in the first direction along the main scan direction to a pixel located in a second direction opposite to the first direction or the right side of FIG. 7 or in the predetermined range Wa in which variations in read values due to a change in the temperature are large. It is, therefore, appropriately suppress the erroneous determination caused by the change in the temperature.

About Detection of Range of Abnormal Pixels

Subsequently, the detection of a range of abnormal pixels is described with reference to FIGS. 11 and later. The abnormality detection program according to the embodiment of the disclosure and the abnormality detection method according to the embodiment of the disclosure are described with reference to flowcharts shown in FIGS. 11 to 14.

The controller 40 detects a range of abnormal pixels based on results of determining whether an abnormality exists in each of the pixels. Then, the controller 40 outputs an alert for dirt to a user based on the results. The alert for dirt is an example of an abnormality process. The alert for dirt is a message alerting the user that dirt is being attached to the reading surface. The message can be displayed on, for example, the operation panel 7 and a display device of the external computer 60 (shown in FIG. 3).

Figure 11:
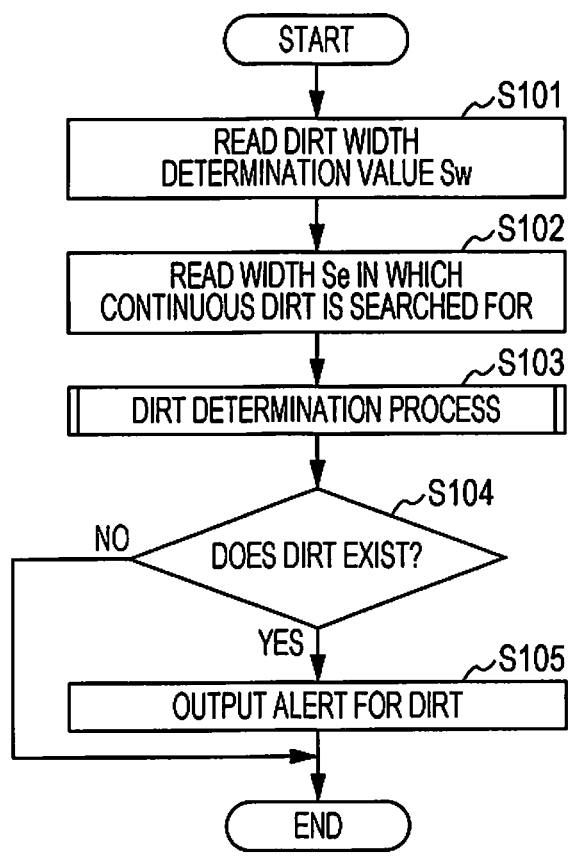
FIG. 11 is a flowchart showing a main flow of an abnormality detection program.

Specifically, the controller 40 reads a dirt width determination value Sw as a "first determination value" as shown in FIG. 11 (in step S101) and reads, as a "second determination value", a width Se in which continuous dirt is searched for (in step S102). Then, the controller 40 detects a range of abnormal pixels or executes a dirt determination process (in step S103). When the controller 40 determines that dirt exists as a result of the dirt determination process (Yes in step S104), the controller 40 outputs the aforementioned alert for dirt (in step S105).

Figure 12:
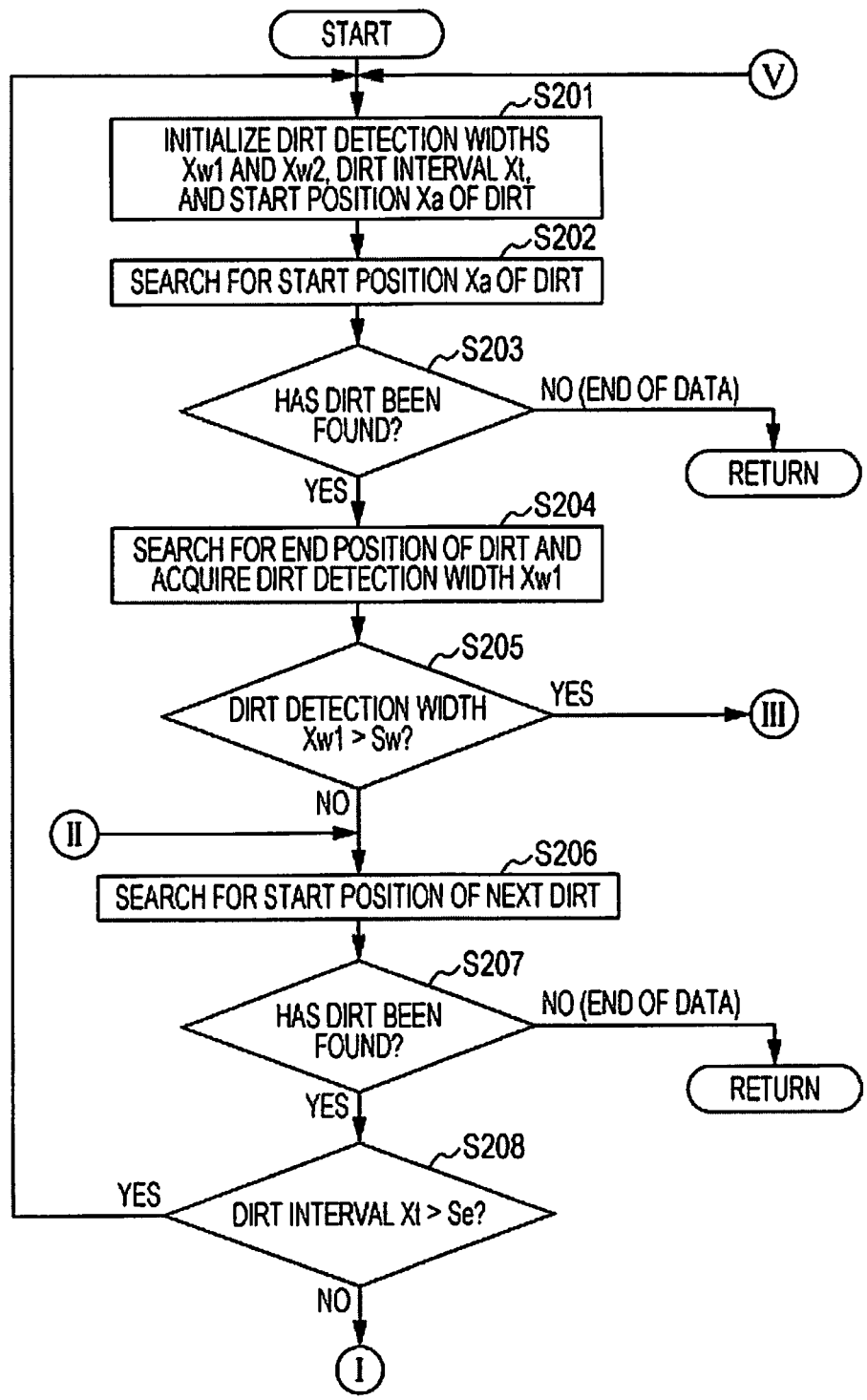
FIG. 12 is a flowchart showing a sub-flow of the abnormality detection program.
Figure 13:
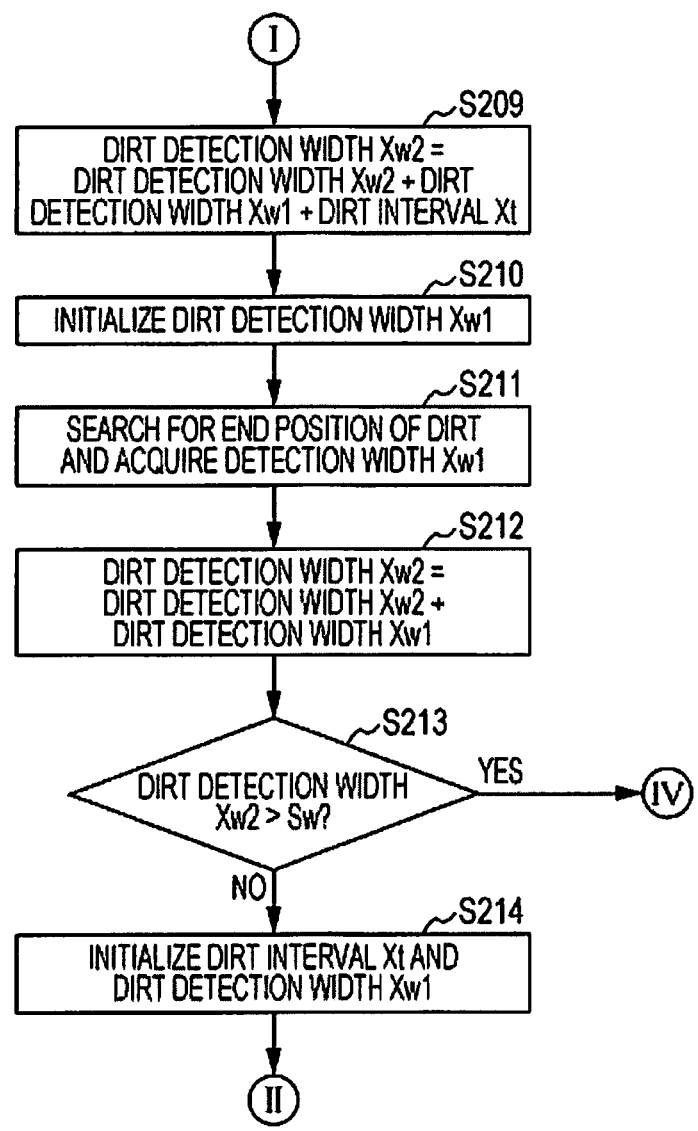
FIG. 13 is a flowchart showing the sub-flow of the abnormality detection program.
Figure 14:
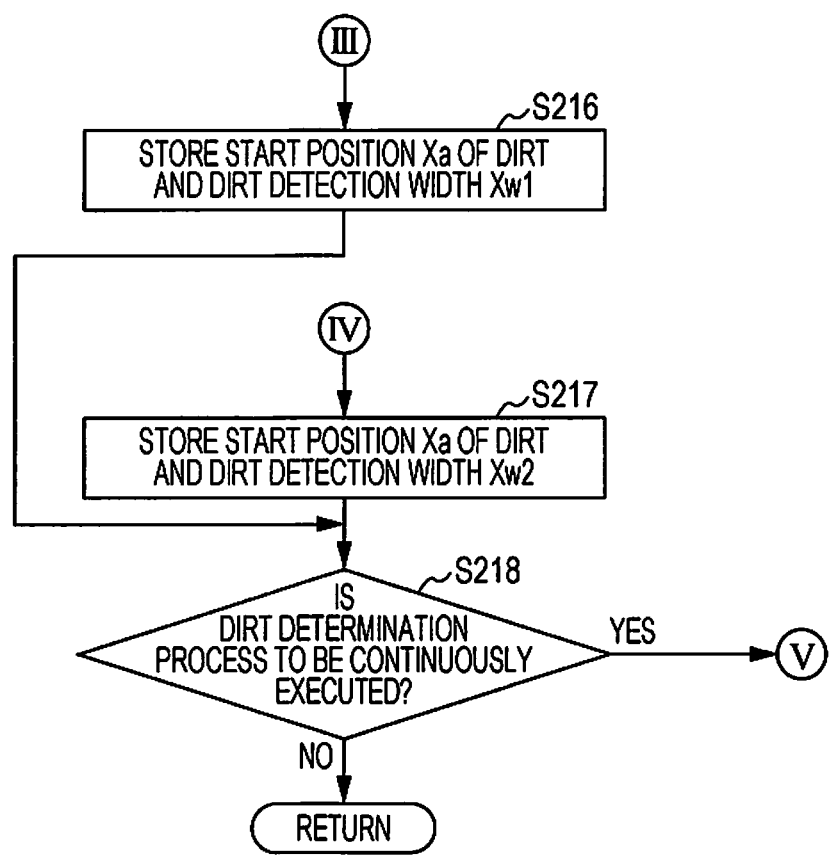
FIG. 14 is a flowchart showing the sub-flow of the abnormality detection program.

The dirt determination process (of step S103) is described below in detail with reference to FIGS. 12 and later. FIGS. 12 to 14 show specific details of the dirt determination process (of step S103).

Roughly speaking, the dirt determination process is to detect a range of abnormal pixels of which the number is larger than the first determination value that is defined in advance, based on whether an abnormality exists in each of the pixels Xi, and to output the alert.

In the embodiment, the range of abnormal pixels includes a range of continuous abnormal pixels where the abnormal pixels appear successively and a range of discontinuous abnormal pixels where one or more normal pixels interpose between an abnormal pixel and a next abnormal pixel, the number of the normal pixels being smaller than a second determination value that is defined in advance, which is the "width Se in which continuous dirt is searched for".

Figure 15:
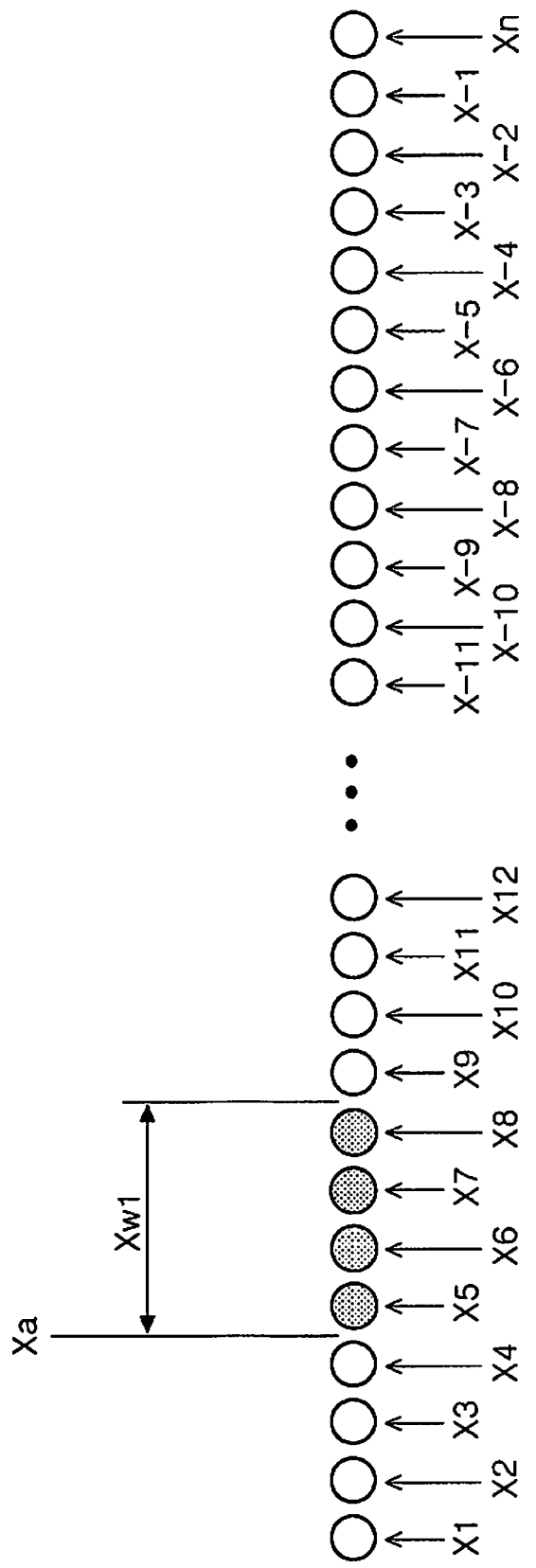
FIG. 15 is a diagram schematically showing an example of a range of continuous abnormal pixels.

Specifically, the controller 40 searches for an abnormality in the pixels in order of the pixels X1, X2, . . . , For example, in an example shown in FIG. 15, a pixel X5 is a start position Xa of dirt, the pixel X5 and pixels X6 to X8 are a range of continuous dirty pixels, the number of dirty pixels is equal to the dirt detection width Xw1, which is 4. When the dirt width determination value Sw is set to 5, the dirt detection width Xw1 is smaller than the dirt width determination value Sw in the example shown in FIG. 15, and the pixels X5 to X8 are not a range of abnormal pixels and do not cause the alert to be output.

Figure 16:
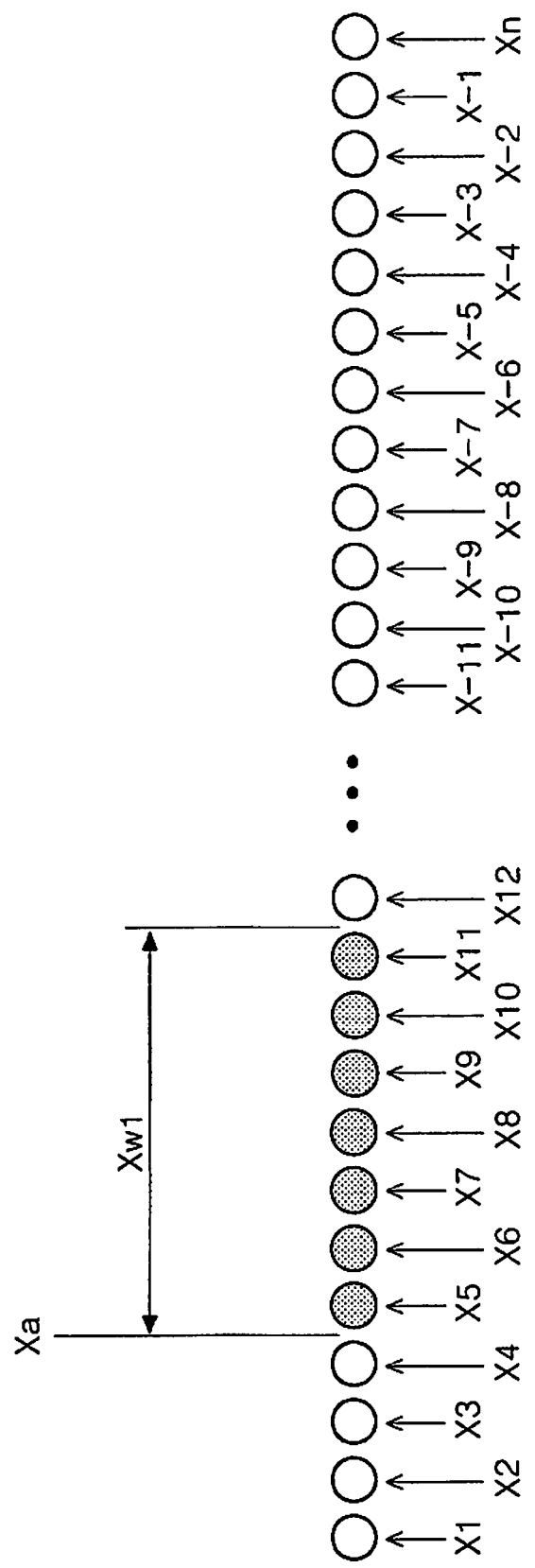
FIG. 16 is a diagram schematically showing an example of a range of continuous abnormal pixels.

In FIG. 16, pixels X5 to X11 are a range of continuous dirty pixels, and the dirt detection width Xw1 is 7. In this case, when the dirt width determination value Sw is set to 5, the dirt detection width Xw1 is larger than the dirt width determination value Sw, and the pixels X5 to X11 are a range of continuous abnormal pixels and cause the alert to be output.

A flow for executing the aforementioned dirt determination process is described using the flowchart shown in FIG. 12. The controller 40 initializes the variables that are the dirt detection widths Xw1 and Xw2, the dirt interval Xt, and the start position Xa of dirt or sets the variables to 0 (in step S201). The dirt detection width Xw2 and the dirt interval Xt are described later.

Next, the controller 40 searches for the start position Xa of dirt (in step S202). When the controller 40 searches for pixels until the end of data or the pixel Xn and does not find a dirty pixel (No in step S203), the process returns to the main flow shown in FIG. 11.

On the other hand, when the controller 40 finds a dirty pixel (Yes in step S203), the controller 40 searches for an end position of dirt and acquires the dirt detection width Xw1 (in step S204). When the acquired dirt detection width Xw1 is larger than the predetermined dirt width determination value Sw (Yes in step S205), the controller 40 determines that a range of continuous abnormal pixels has been detected and the process proceeds to step S216 shown in FIG. 14.

The start position Xa of dirt and the dirt detection value Xw1 are stored in the memory 43 in step S216. When the dirt determination process is continuously executed (Yes in step S218), the process is executed again from step S201 shown in FIG. 12.

When the dirt determination process is terminated (No in step S218), the process returns to the main flow shown in FIG. 11.

Step S216 or the process of storing the start position Xa of dirt and the dirt detection width Xw1 may be omitted.

Subsequently, a range of discontinuous abnormal pixels is described. A group of continuous abnormal pixels may be an image failure viewable by the user. In addition, when one or more normal pixels interpose between an abnormal pixel and a next abnormal pixel, or there are the discontinuous abnormal pixels between which a small number of normal pixels interpose, a range of the discontinuous abnormal pixels may be an image failure viewable by the user.

The "width Se in which continuous dirt is searched for" is set as a determination value for the number of normal pixels between a certain abnormal pixel and a next abnormal pixel. When an entire width of the normal pixels is smaller than the width Se, a detected dirt range is determined as a range of discontinuous abnormal pixels and the alert is output for the detected dirt range. On the other hand, when the entire width of the normal pixels is larger than the width Se, the detected dirt range is not determined as a range of discontinuous abnormal pixels and the alert is not output for the detected dirt range.

Figure 17:
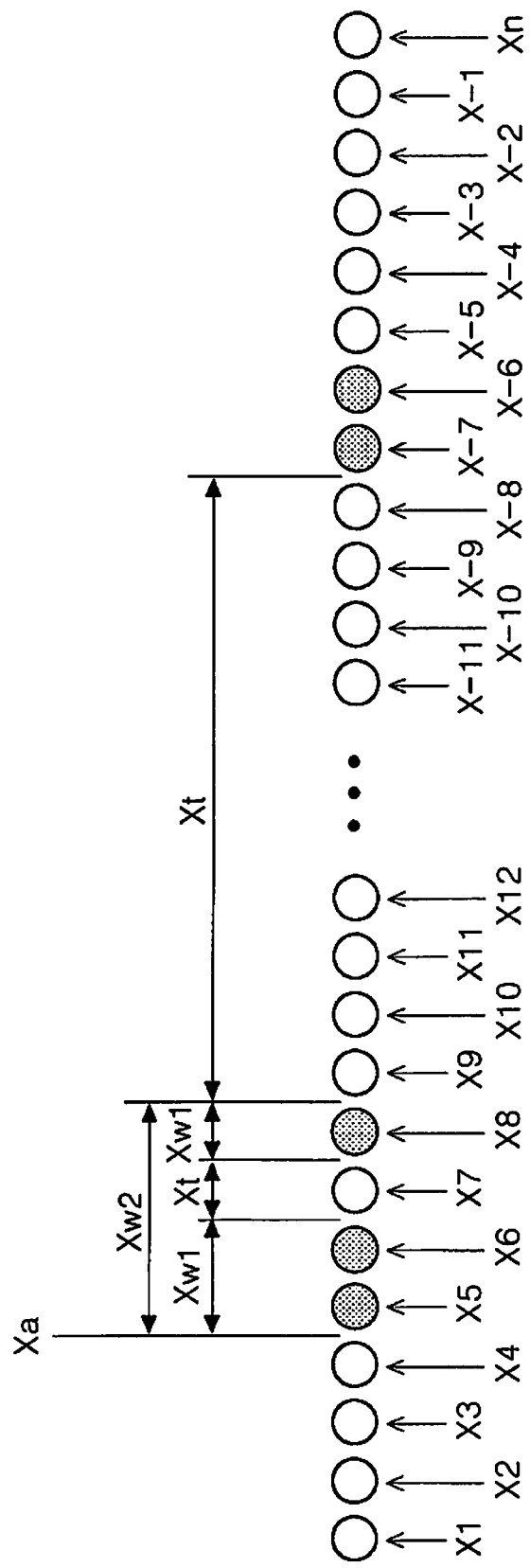
FIG. 17 is a diagram schematically showing an example of a range of discontinuous abnormal pixels.

In an example shown in FIG. 17, since the pixel X5 is a start position Xa of dirt and a normal pixel X7 is located between abnormal pixels X6 and X8, the number of normal pixels or the dirt interval Xt is 1. When the "width Se in which continuous dirt is searched for" is set to "10", the dirt interval Xt is smaller than the width Se, and a range of the pixels X5 to X8 is a candidate for a range of discontinuous abnormal pixels. In the example shown in FIG. 17, since the range of the pixels X5 to X8 is not is not lager than the dirt width determination value Sw, a range of discontinuous abnormal pixels is not determined at this time and continuous dirt is searched for.

In the example shown in FIG. 17, since the number of normal pixels located between the abnormal pixel X8 and a next abnormal pixel X-7 is large and the dirt interval Xt is larger than the width Se, a range of pixels X5 to X-6 is not a group of dirty pixels, and the range of the pixels X5 to X8 is the final dirt detection width Xw2. The dirt detection width Xw2 is a variable to be used to search for a range of discontinuous abnormal pixels and is different from the variable Xw1 to be used to search for a range of continuous abnormal pixels in the embodiment.

In the example shown in FIG. 17, when the defined dirt detection width Xw2 is "4" and the dirt width determination value Sw is set to 5, the dirt detection width Xw2 is smaller than the dirt width determination value Sw, and the alert is not output for the detected range.

Figure 18:
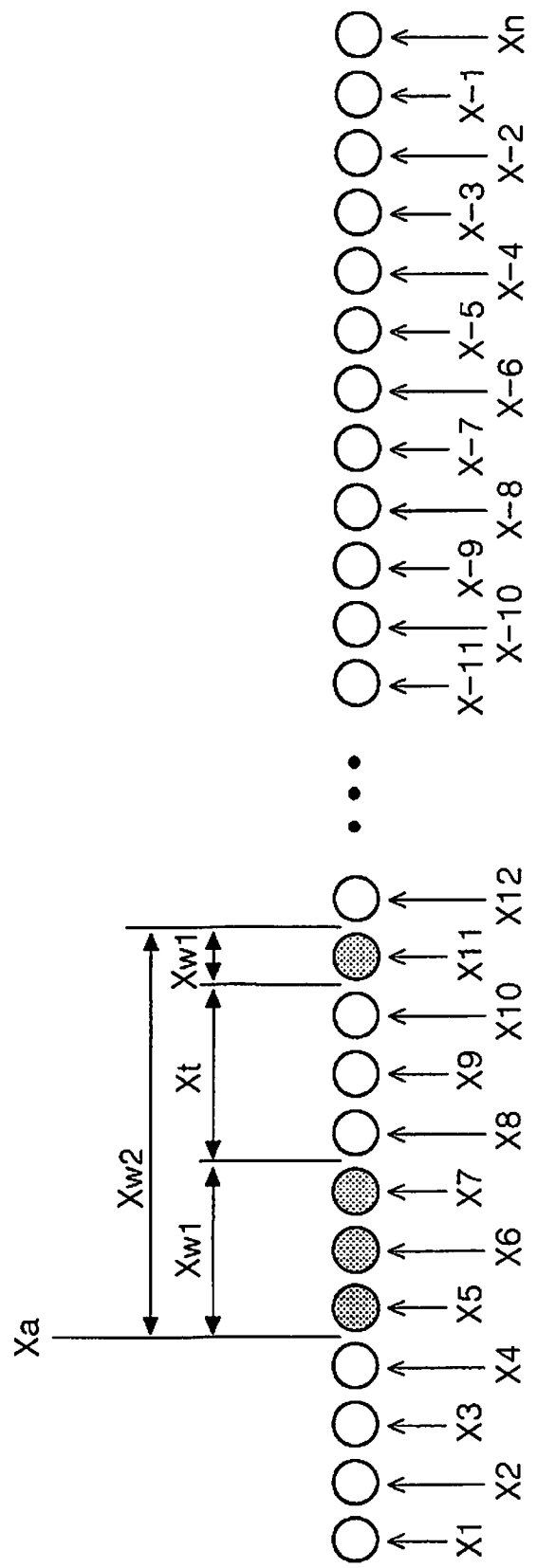
FIG. 18 is a diagram schematically showing an example of a range of discontinuous abnormal pixels.

In an example shown in FIG. 18, since a detected dirt range defined by the same determination method is from the pixel X5 to the pixel X11, or the dirt detection width Xw2 is "7" and is larger than the dirt width determination value Sw, the pixels X5 to X11 are a range of discontinuous abnormal pixels and an alert is output for the range of the abnormal pixels X5 to X11.

A flow for executing the aforementioned determination is described with reference to the flowchart shown in FIG. 12. When the dirt detection width Xw1 indicating a width of a group of continuous abnormal pixels is equal to or smaller than the dirt width determination value Sw (No in step S205), the controller 40 searches for a start position of next dirt (in step S206). When the controller 40 searches for the pixels until the end of the data or the pixel Xn and does not find a dirty pixel (No in step S207), the process returns to the main flow shown in FIG. 11.

On the other hand, when the controller 40 finds one or more dirty pixels (Yes in step S207), and the dirt interval Xt is larger than the width Se that is the predetermined determination value (Yes in step S208), the dirty pixels are not a group of dirty pixels viewable by the user and the process is executed again from step S201.

When the dirt interval Xt is smaller than the width Se that is the predetermined determination value (No in step S208), the pixels may be a group of dirty pixels viewable by the user and the controller 40 searches for next one or more dirty pixels.

Specifically, the process proceeds to step S209 shown in FIG. 13 to temporarily set the dirt detection width Xw2 to the sum of the dirt detection width Xw2, the dirt detection width Xw1, and the dirt interval Xt, and the controller 40 initializes the dirt detection width Xw1 or sets the dirt detection width Xw1 to 0 (in step S210), searches for an end position of the dirt, and newly acquires the dirt detection width Xw1 (in step S211).

Thus, the dirt detection width Xw2 is set by adding the newly acquired dirt detection width Xw1 to the dirt detection width Xw2 (in step S212).

An example of the dirt detection width Xw2 upon the termination of step S209 is an entire width of the pixels X5 to X10 shown in FIG. 18, and an example of the dirt detection width Xw2 upon the termination of step S212 is an entire width of the pixels X5 to X11 shown in FIG. 18.

When the dirt detection width Xw2 upon the termination of step S212 is larger than the predetermined dirt width determination value Sw (Yes in step S213), a range of discontinuous abnormal pixels is defined and the process proceeds to step S217 shown in FIG. 14.

The start position Xa of dirt and the dirt detection width Xw2 are stored in the memory 43 in step S217. When the dirt determination process is continuously executed (Yes in step S218), the process is executed again from step S201 shown in FIG. 12.

Step S217 or the process of storing the start position Xa of the dirt and the dirt detection width Xw2 may be omitted.

Return to FIG. 13. When the dirt detection width Xw2 upon the termination of step S212 is equal to or smaller than the predetermined dirt width determination value Sw in step S213), the dirt detection value Xw1 and the dirt interval Xt in which a next pixel is to be searched for are initialized or set to 0, and the process is executed again from step S206 shown in FIG. 12.

In the case where the scanner 1A according to the embodiment detects, based on whether an abnormality exists in each of the pixels, a range of abnormal pixels of which the number is larger than the dirt width determination value Sw or the first determination value that is defined in advance, and the scanner 1A executes the abnormality process, the scanner 1A causes the range of the abnormal pixels to include a range of continuous abnormal pixels where the abnormal pixels appear successively and a range of discontinuous abnormal pixels where one or more normal pixels interposed between an abnormal pixel and a next abnormal pixel, the number of the normal pixels is smaller than the width Se, which is the second determination value defined in advance. Thus, an image failure viewable by the user can be detected.

The abnormality detection program according to the embodiment and the abnormality detection method according to the embodiment include the process of reading the data Ri (refer to FIGS. 5 and 6) stored in the memory 43 (refer to FIG. 3) and the first correction values Fi (refer to FIG. 9) stored in the memory 43 and determining whether an abnormality exists in each of the pixels based on the data Li (refer to FIGS. 5 and 6). This process corresponds to steps S11 to S21 shown in FIG. 10. The memory 43 is an example of the storage unit. The data Ri is the read values of the reading standard surface 22a (FIG. 4) and serves as the standards. The first correction values Fi are an example of the second data and indicate the ranges of variation, based on the change in the temperature, in the read values. The data Li is an example of the third data and is obtained by reading the reading standard surface 22a after the acquisition of the first data.

When one or more normal pixels interpose between an abnormal pixel and a next abnormal pixel and the number of normal pixels interposing between the abnormal pixels is smaller than the width Se or the second determination value that is defined in advance, a process of setting, to a range of the abnormal pixels, a range of the discontinuous abnormal pixels between which the one or more normal pixels interpose is included. This process corresponds to steps S208 to S213 shown in FIGS. 12 and 13.

In the embodiment, the controller 40 defines a range of abnormal pixels based on whether an abnormality exists in each of all the pixels arranged in the main scan direction. In other words, since all ranges of abnormal pixels within an entire region extending in the main scan direction are detected, an abnormal state can be appropriately recognized.

However, after the controller 40 detects a range of abnormal pixels for the first time, the controller 40 may execute the abnormality process without searching for a next abnormal pixel range. Thus, the process can be executed at a high speed. In this case, in the embodiment, the determination process of step S218 shown in FIG. 14 may be omitted.

In addition, the dirt width determination value Sw serving as the first determination value may include a first setting value and a second setting value larger than the first setting value. As the dirt width determination value Sw, multiple setting values such as the first setting value and the second setting value may be set. For example, the user may select, from the operation panel 7 (shown in FIG. 1), "low sensitivity" or "high sensitivity" as the sensitivity of detecting dirt. When the "low sensitivity" is selected, the second setting value is selected. When the "high sensitivity" is selected, the first setting value is selected. Thus, the sensitivity of detecting dirt can be adjusted.

For example, it is considered that "5" is set as the first setting value and that "20" is set as the second setting value.

In addition, as the width Se in which continuous dirt is searched for, multiple values may be set. For example, a first width Se1 and a second width Se2, which is larger than the first width Se1, are set. As the number of normal pixels interposing between an abnormal pixel and a next abnormal pixel is larger, dirt is more unnoticeable. Thus, when the low sensitivity is set, the first width Se1 is used. When the high sensitivity is set, the second width Se2 is used.

The aforementioned abnormality detection program is an example and not limited to the program described in the embodiment. Specifically, any process may be executed as far as the process is executed to treat, as groups of abnormal pixels, not only a group of continuous abnormal pixels but also a group of abnormal pixels between which one or more normal pixels interpose when the groups of the abnormal pixels satisfy the predetermined requirement.

In addition, the aforementioned abnormality detection program may be executed at arbitrary time. For example, the abnormality detection program may be executed upon the turning on of the scanner 1A, or before or after the start of a scan job, or every time a predetermined number of document sheets are scanned. When one-side reading is set, the abnormality detection program may be executed for only a reading sensor that is either the upper reading sensor 20A or the lower reading sensor 20B and is used.

Whether the abnormality detection program is executed may be set by the user. Specifically, the abnormality detection program may be executed or not executed based on the user setting.

What is claimed is:

1. An image reading device comprising:
   a reading unit that reads a document sheet and a reading standard surface and outputs read values corresponding to pixels arranged in a main scan direction;
   a control unit that processes the read values; and
   a storage unit storing information to be referenced by the control unit, wherein
   first data that is read values of the reading standard surface and serves as standards, and second data on ranges of variation, based on a change in a temperature, in the read values are stored in the storage unit, and wherein
   the control unit determines, based on the first data and the second data read from the storage unit and third data obtained by reading the reading standard surface after an acquisition of the first data, whether an abnormality exists in the pixels.

2. The image reading device according to claim 1, wherein
   the second data is calculated values obtained by adding values equal to or larger than twice standard deviations of the ranges of variation, based on the change in the temperature, in the read values obtained for pixels using multiple image reading devices, each of which is the image reading device of claim 1, to average values of the ranges of variation, based on the change in the temperature, in the read values or is data obtained based on the calculated values.

3. The image reading device according to claim 1, wherein
   when a difference between the first data and the third data after levels of the first data and the third data are matched to each other is larger than a threshold set based on the second data, the control unit determines that an abnormality exists in the pixel, and when the difference is equal to or smaller than the threshold, the control unit determines that an abnormality does not exist in the pixel.

4. The image reading device according to claim 1, wherein
   the reading unit includes
   a light source located at an edge in a first direction along the main scan direction, and
   a light guide extending in the main scan direction and configured to guide, in a direction of the reading standard surface, light emitted in the main scan direction by the light source, and wherein
   the second data corresponds to pixels existing in a predetermined range from the edge in the first direction along the main scan direction to a pixel located in a second direction opposite to the first direction.

5. The image reading device according to claim 1, wherein
   the control unit detects, based on whether an abnormality exists in the pixels, an abnormal pixel range in which the number of pixels is larger than a first determination value that is defined in advance, and the control unit executes an abnormality process, and wherein
   the abnormal pixel range includes a range of continuous abnormal pixels where the abnormal pixels appear successively and a range of discontinuous abnormal pixels where one or more normal pixels interpose between an abnormal pixel and a next abnormal pixel, the number of the normal pixels being smaller than a second determination value that is defined in advance.

6. The image reading device according to claim 5, wherein
   the control unit defines the abnormal pixel range based on whether an abnormality exists in all the pixels arranged in the main scan direction.

7. The image reading device according to claim 5, wherein
   after the control unit defines the abnormal pixel range for a first time, the control unit executes the abnormality process without searching for a next abnormal pixel range.

8. The image reading device according to claim 5, wherein
   the first determination value includes a first setting value and a second setting value larger than the first setting value, and wherein
   the control unit selects any of the first setting value and the second setting value.

9. A non-transitory computer-readable storage medium storing an abnormality detection program for causing an image reading device, which includes a reading unit that reads a document sheet and a reading standard surface and outputs read values corresponding to pixels arranged in a main scan direction, a control unit that processes the read values, and a storage unit storing information to be referenced by the control unit, to detect, based on whether an abnormality exists in the pixels, an abnormal pixel range in which the number of pixels is larger than a first determination value that is defined in advance and to execute an abnormality process, the abnormality detection program comprising:
   reading first data indicating read values of the reading standard surface and serving as standards and second data on ranges of variation, based on a change in a temperature, in the read values, the first data and the second data being stored in the storage unit, and determining, based on third data obtained by reading the reading standard surface after an acquisition of the first data, whether an abnormality exists in the pixels; and setting, when one or more normal pixels interpose between an abnormal pixel and a next abnormal pixel, a range of the discontinuous abnormal pixels in which the number of the normal pixels is smaller than a second determination value that is defined in advance, to the abnormal pixel range.

10. An abnormality detection method for causing an image reading device, which includes a reading unit that reads a document sheet and a reading standard surface and outputs read values corresponding to pixels arranged in a main scan direction, a control unit that processes the read values, and a storage unit storing information to be referenced by the control unit, to detect, based on whether an abnormality exists in the pixels, an abnormal pixel range in which the number of pixels is larger than a first determination value that is defined in advance and to execute an abnormality process, the method comprising:

reading first data indicating read values of the reading standard surface and serving as standards and second data on ranges of variation, based on a change in a temperature, in the read values, the first data and the second data being stored in the storage unit, and determining, based on third data obtained by reading the reading standard surface after an acquisition of the first data, whether an abnormality exists in the pixels; and setting, when one or more normal pixels interpose between an abnormal pixel and a next abnormal pixel, a range of the discontinuous abnormal pixels in which the number of the normal pixels is smaller than a second determination value that is defined in advance, to the abnormal pixel range.

\* \* \* \* \*